INVENTOR
JOHN C. SIMS, JR.
BY
Kenway, Jenney & Hildreth
ATTORNEYS

April 9, 1968 J. C. SIMS, JR 3,377,620

VARIABLE WORD LENGTH INTERNALLY PROGRAMMED INFORMATION PROCESSING SYSTEM

Filed April 10, 1964 20 Sheets-Sheet 2

INVENTOR
JOHN C. SIMS, JR.
BY
Kenway, Jenney & Hildreth
ATTORNEYS

April 9, 1968 J. C. SIMS, JR 3,377,620

VARIABLE WORD LENGTH INTERNALLY PROGRAMMED INFORMATION PROCESSING SYSTEM

Filed April 10, 1964 20 Sheets-Sheet 3

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

April 9, 1968 J. C. SIMS, JR 3,377,620
VARIABLE WORD LENGTH INTERNALLY PROGRAMMED
INFORMATION PROCESSING SYSTEM
Filed April 10, 1964 20 Sheets-Sheet 11

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY *Kenway, Jenney & Hildreth*
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

April 9, 1968 J. C. SIMS, JR 3,377,620

VARIABLE WORD LENGTH INTERNALLY PROGRAMMED INFORMATION PROCESSING SYSTEM

Filed April 10, 1964 20 Sheets-Sheet 19

INVENTOR
JOHN C. SIMS, JR.
BY
Kenway, Jenney & Hildreth
ATTORNEYS

INVENTOR
JOHN C. SIMS, JR.
BY
Kenway, Jenney & Hildreth
ATTORNEYS

United States Patent Office 3,377,620
Patented Apr. 9, 1968

3,377,620

VARIABLE WORD LENGTH INTERNALLY PROGRAMMED INFORMATION PROCESSING SYSTEM

John C. Sims, Jr., Sudbury, Mass., assignor, by mesne assignments, to Mohawk Data Science Corporation, East Herkimer, N.Y., a corporation of New York Filed Apr. 10, 1964, Ser. No. 358,853
16 Claims. (Cl. 340—172.5)

My invention relates to information processing apparatus, and particularly to an internally programmed information processing system incorporating a novel variable word length instruction register loading system.

Information processing apparatus of the type developed for computing and other data processing applications, so far as I am aware, has been of the one-address, two-address, or three-address type. A one-address system is capable of processing an instruction word in a program comprising an operation code, defining the operation to be performed, and an address code, defining the location in memory of the information to be processed. A typical program sequence for such a system would be:

A742
A108
M100

The machine would execute these instructions by adding the contents of memory address 742 to the contents of memory address 108 and placing the result in address 100. A two-address system of a first type has the ability to process program words comprising an operation code followed by an A address and a B address. In such a system, the operation defined by the operation code is carried out both on the information stored at the A address and the information stored at the B address, the result of the operation usually being returned to the B address. A second type of two-address system utilizes a program comprising an operation code followed by a first address and a second control address specifying the location of the next address in memory to be accessed following the execution of the operation. A three-address system might utilize a program comprising an instruction word consisting of an operation code followed by A and B addresses of information to be processed during the operation and terminated by a C address specifying the location in memory to be accessed after the operation is completed. All of these systems require programs in which a complete instruction word must be specified at each step of the program, except that in some of the two-address systems it is possible to write a new instruction which changes only the initial side of the preceding instruction. For example, in such a system if an instruction word A(123) (124), meaning operation A, A address 123 and B address 124, was followed by an instruction word consisting only of a new operation code B, the contents of the instruction register preceding the execution of the second instruction would be the second operation code B followed by the A and B addresses residual from the preceding operation.

While the prior systems described above have proven quite satisfactory for a number of purposes, they require extensive effort in the writing of programs, as well as a considerable storage capacity used only for the storage of program information. It is the primary object of my invention to greatly reduce the amount of program storage required in the memory of an internally programmed information processing system.

Briefly, the data processing system of my invention comprises an instruction register, what may broadly be termed a distributor for sequentially supplying characters to the instruction register from a suitable memory, and means for detecting a special skip character in the character sequence and responding to the detection of the skip character to skip desired locations in the instruction register during the loading of a control word. The instruction register should have a capacity for at least one operation defining character, or operation code, and at least one character of at least one address defining the entry location in memory of the information to be processed. With this construction, as will appear in more detail below, it is possible to greatly reduce the amount of capacity required to store a program, because a simplified type of programming, which I shall term "differential" programming, may be employed.

Differential programming is characterized by the writing of programs consisting of instruction words of variable length, each of which may consist of a complete new instruction word, or may modify only any selected portion of a preceding instruction word. I have found that apparatus capable of handling programs written in this way not only requires far less storage for programs, but is capable of certain sequential operations which cannot be performed with conventional systems. As an example, suppose that a program instruction has been given consisting of a one-character operation code, a three-character A address and a three-character B address, as follows: A(123) (456). As known in the art, the A and B addresses define entry points to fields of data to be operated on. In operation, using conventional digital equipment for carrying out an instruction stored in an instruction register, the initial A address 123 and the initial B address 456 are incremented as the instruction is executed. Thus, the residual A address and B address after the instruction has been completed will depend on the length of the fields beginning with the A and B addresses. Since the length of each data field may have been determined long prior to the current operation, the terminating points of these fields may be known only to the programmer who first programmed the storage of the field, and it may be extremely difficult, if not impossible, for a programmer writing a later instruction to know what the residual A and B addresses will be. He may, for example, know that the next field in memory to be processed is contiguous to both of the fields starting at the locations defined by the original A and B addresses. However, it might be desirable to execute a sub-routine before processing the next field. With the apparatus of my invention, it is possible to carry out this process without knowing the terminating points of the A and B fields. This capability results from the ability of the apparatus to process a program comprising the following sequence of instructions: (1) a first instruction which consists of an operation code to which the system will respond by holding the residual A address and placing it in a separate register, the A and B address portions of the first instruction word being replaced by skip characters; (2) an instruction which will store the A address in memory, consisting of an operation code plus an A address defining where the held A address is to be stored, the B address in this instruction being replaced with skip characters; (3) an instruction to hold the B address residual from the preceding operation and store it in a separate register; (4) an instruction to store the residual B address held in the preceding operation in a specified address; and (5), an instruction to proceed to the sub-routine, and exit from the sub-routine to the address which will locate the terminating field addresses of the original instruction. The operations directed by such a program cannot be carried out in conventional systems, because it is not possible in such systems to hold both addresses while storing one.

The information processing system of my invention will best be understood from the following detailed description, together with the accompanying drawings, of a preferred embodiment thereof.

Figure 9:
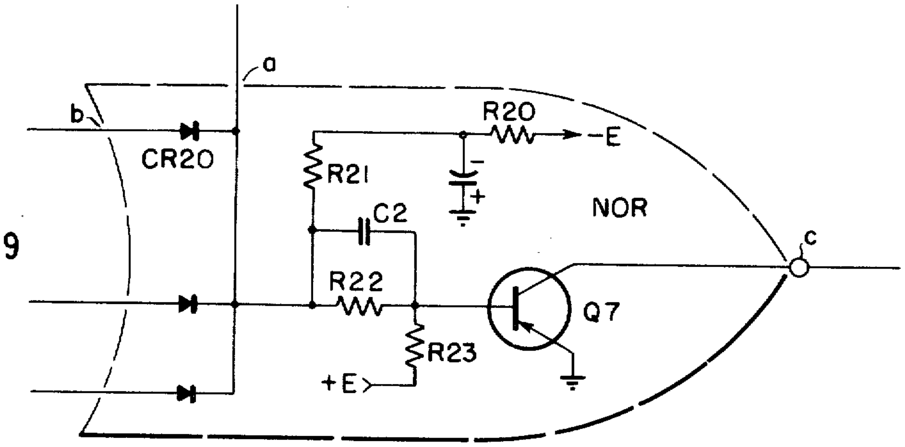
Figure 2:
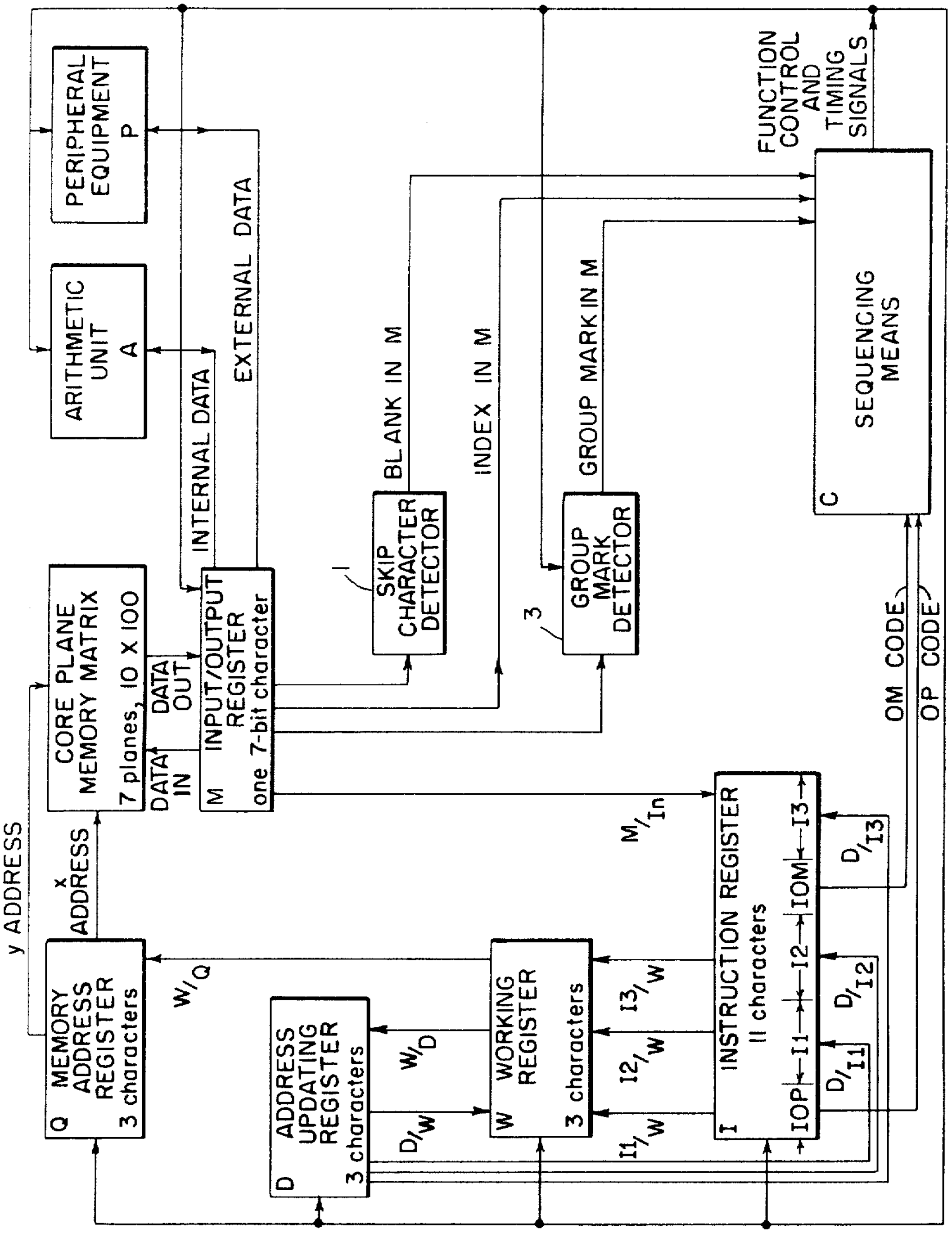
FIG. 2 is a block diagram of a practical embodiment of my invention connected in combination with a conventional arithmetic register and sequencing means to function as a digital computer in cooperation with peripheral equipment.
Figure 4A:
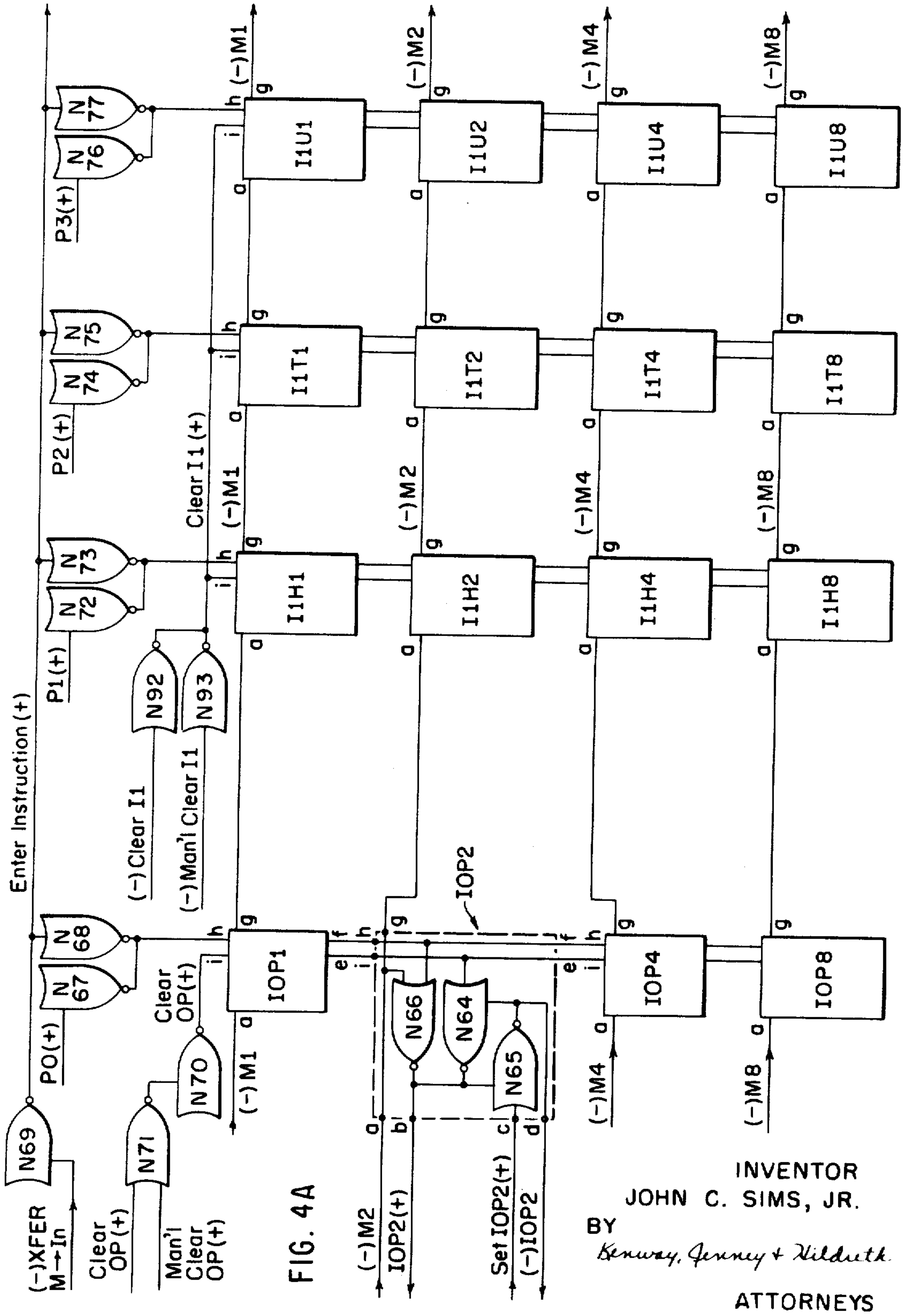
Figure 4B:
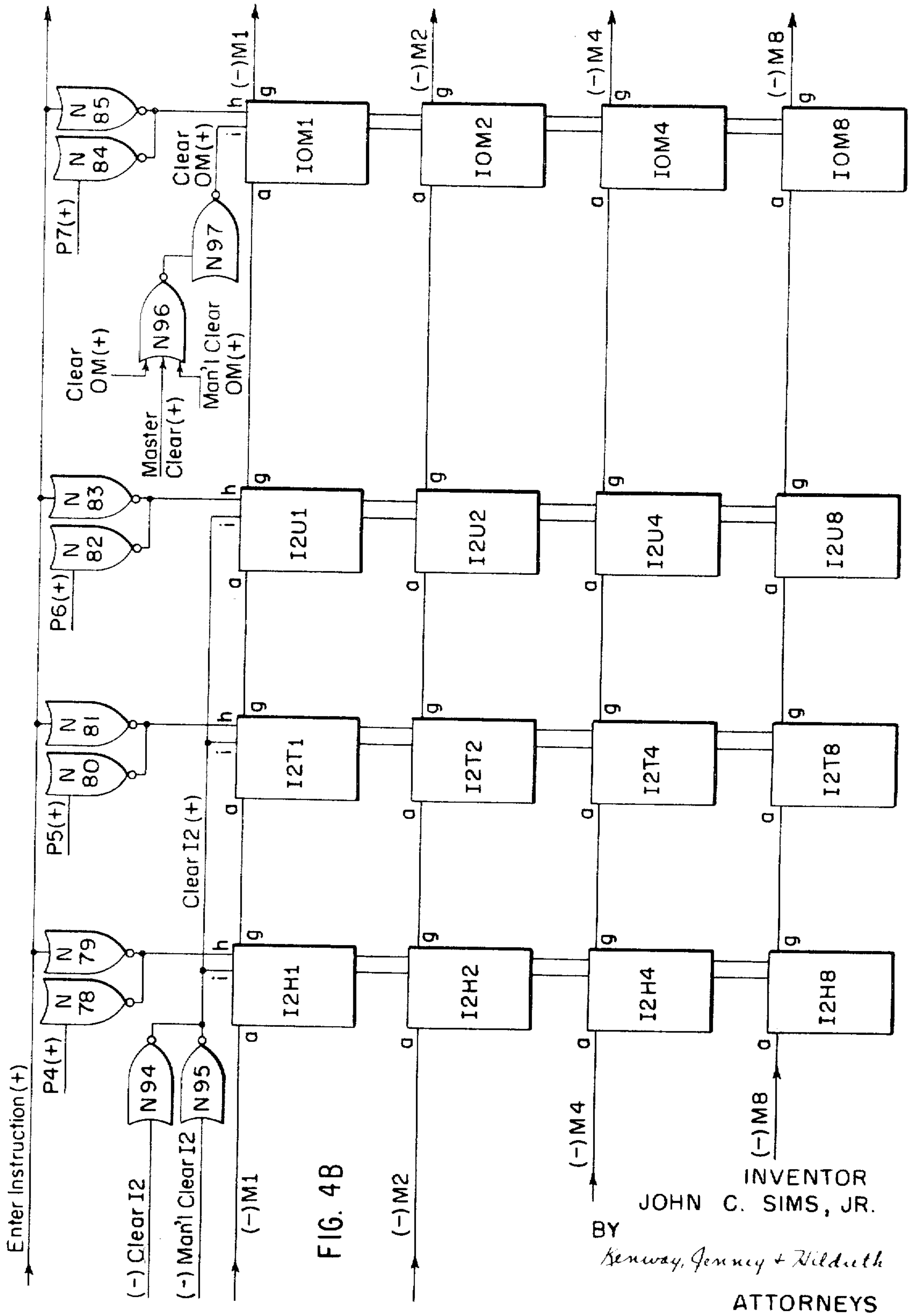
Figure 4C:
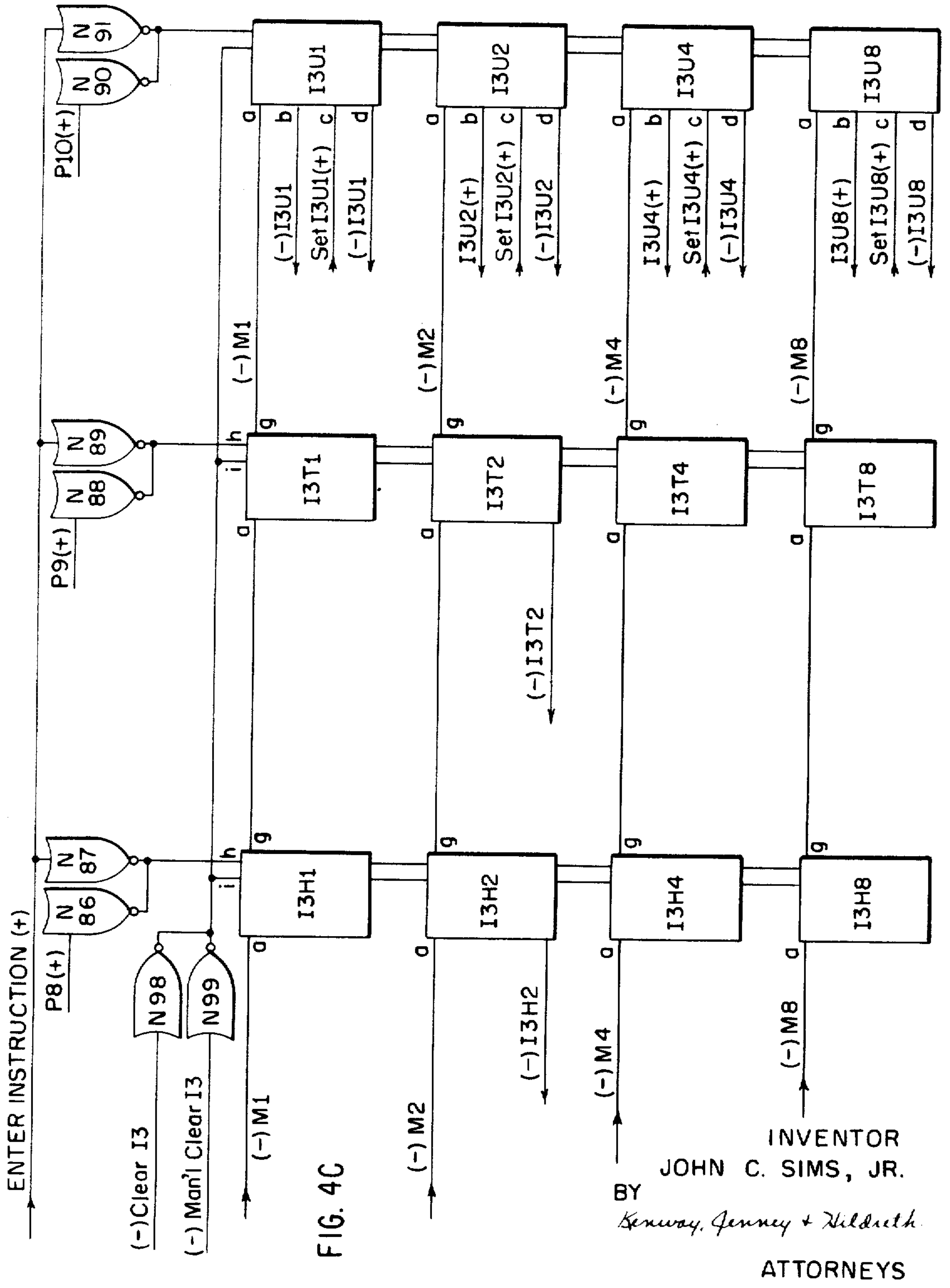
Figure 5A:
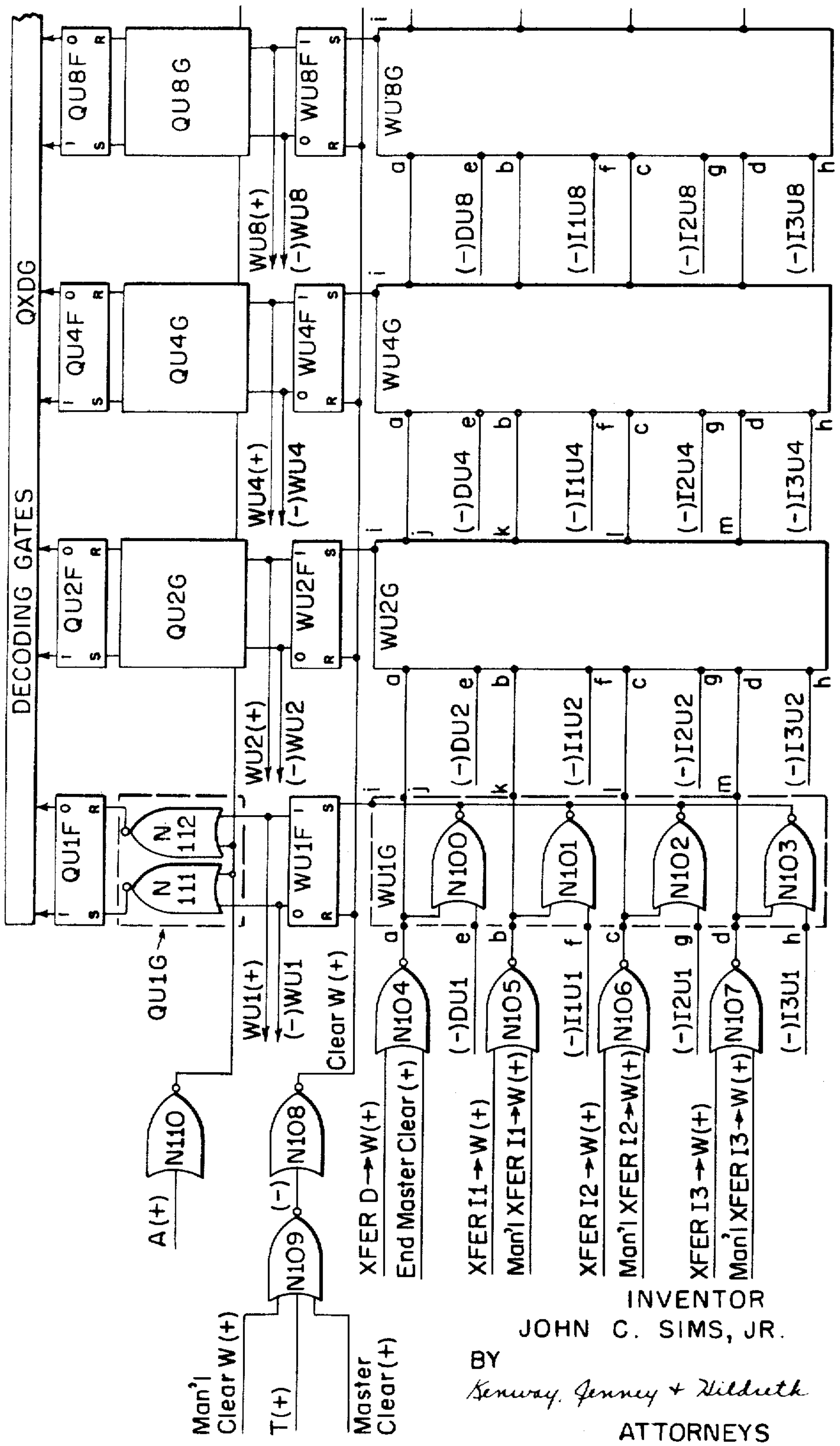
Figure 5B:
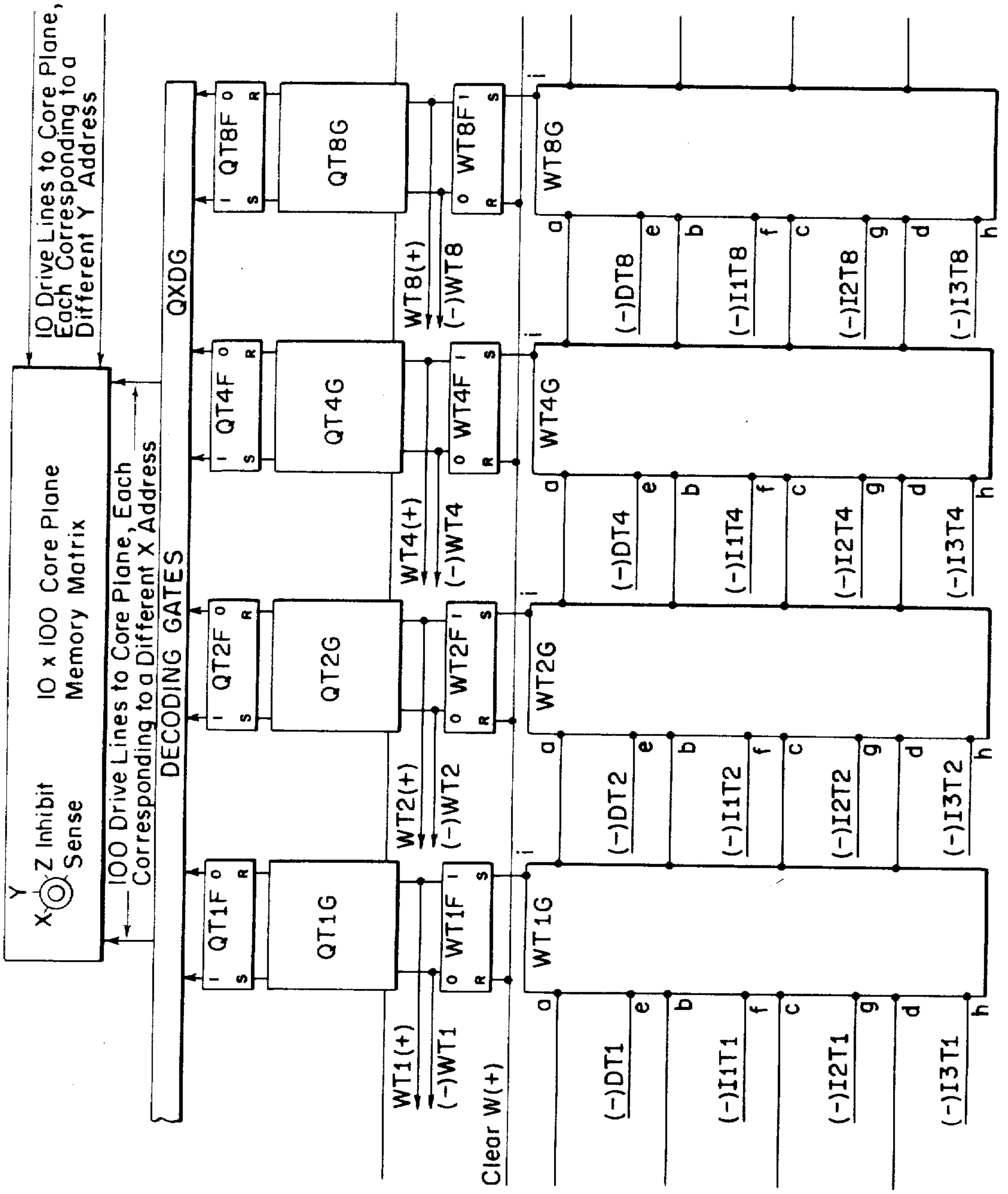
Figure 5C:
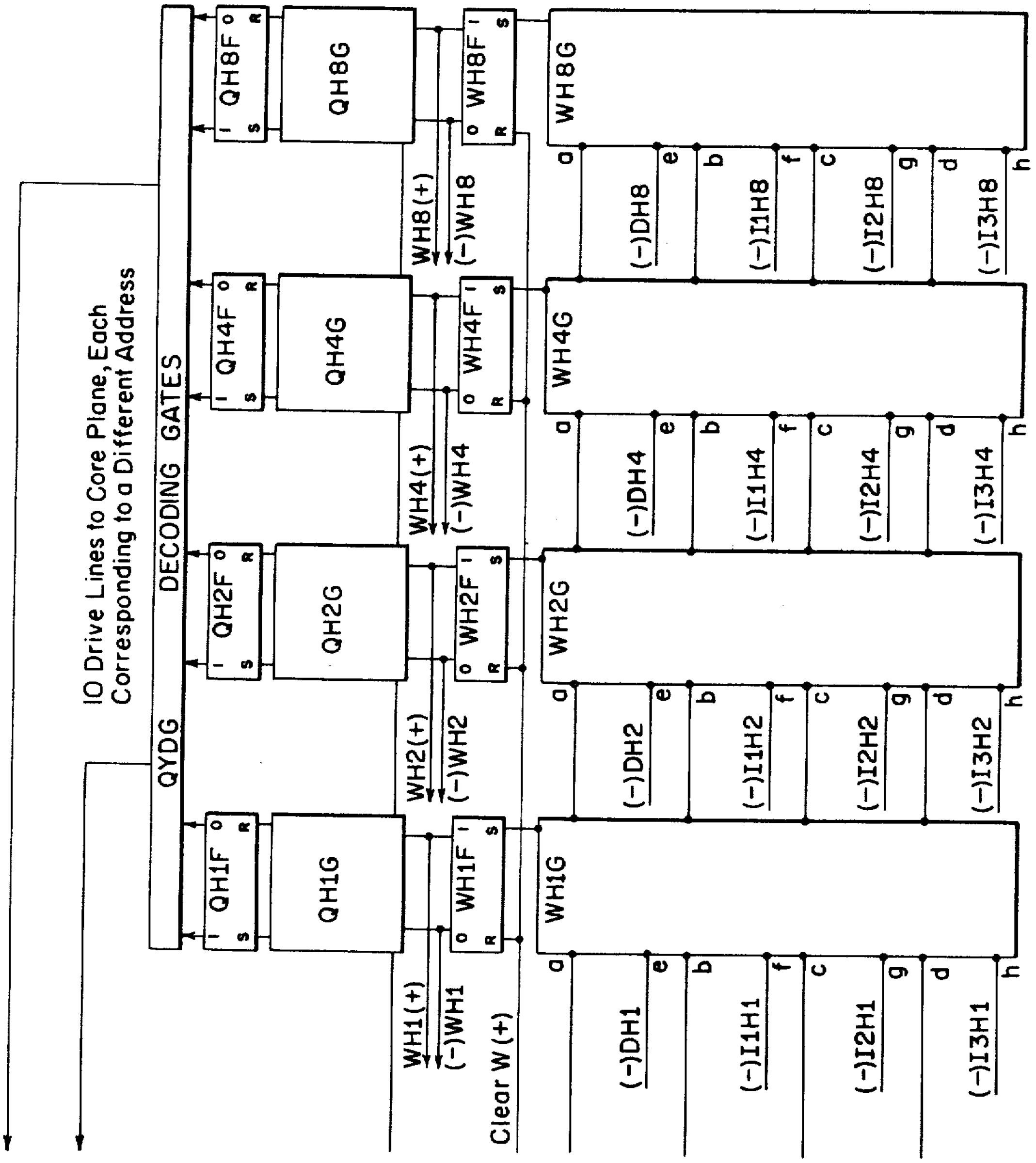
Figure 6:
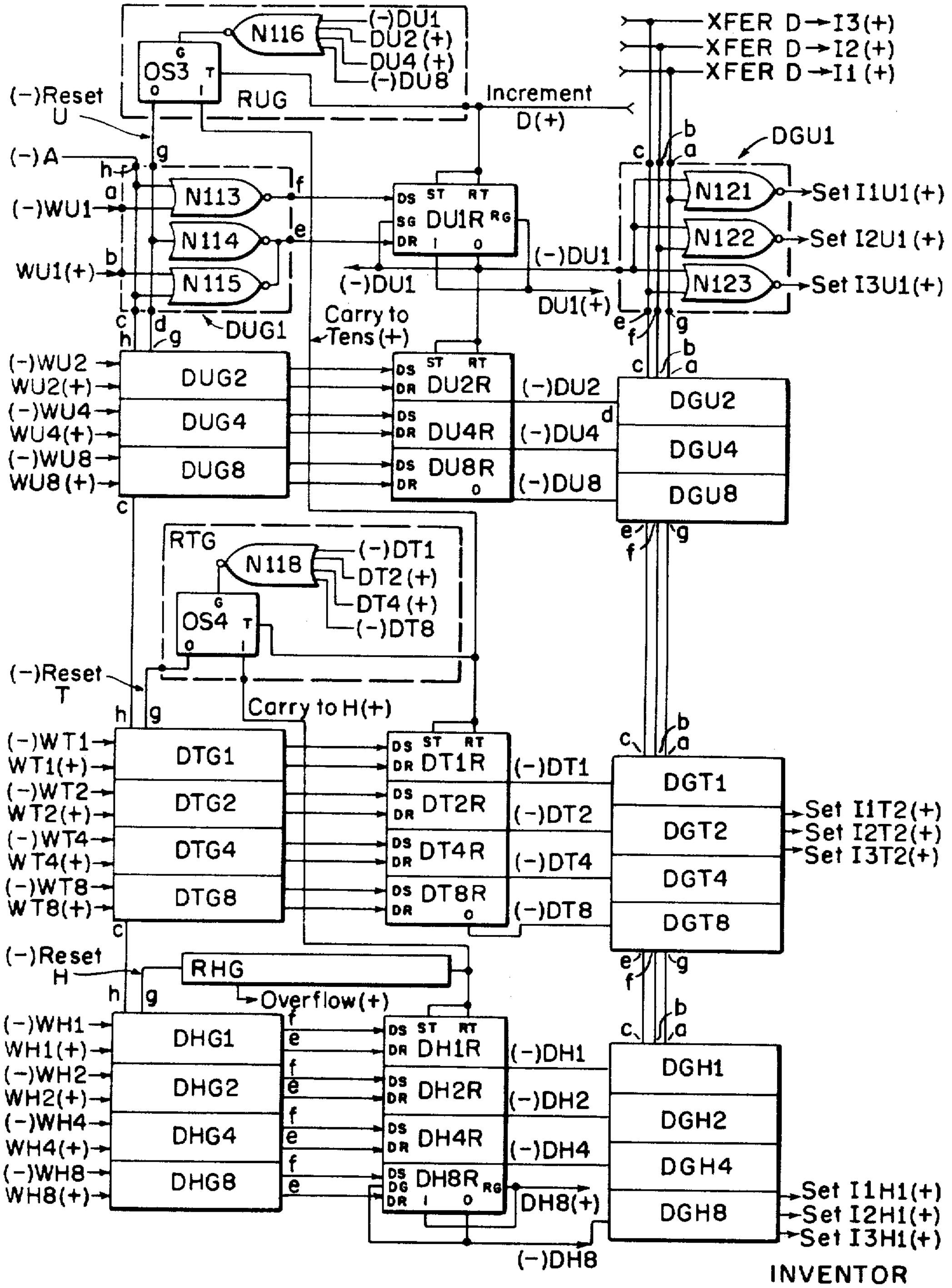
Figure 7:
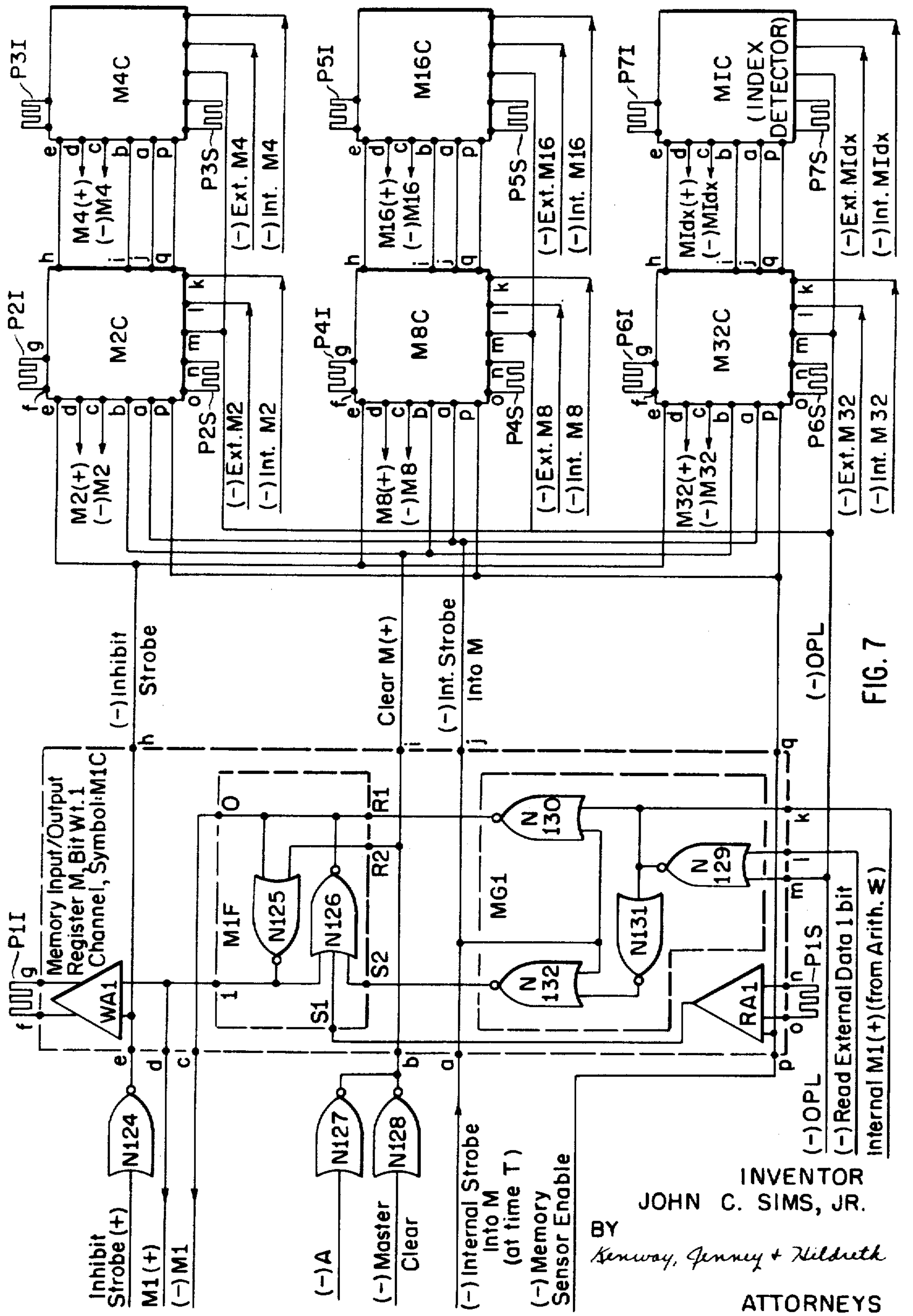
Figure 8:
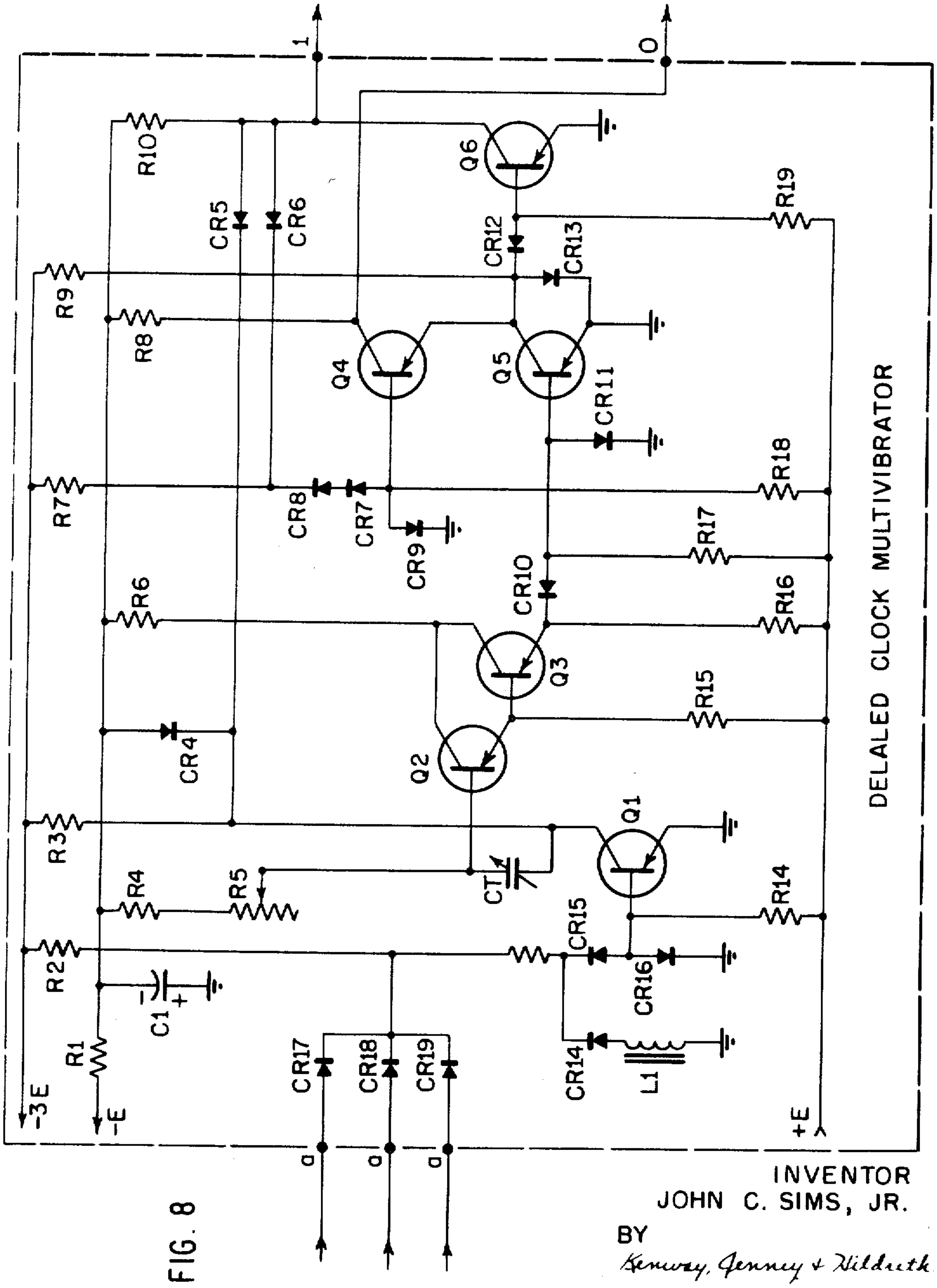
Figure 10:
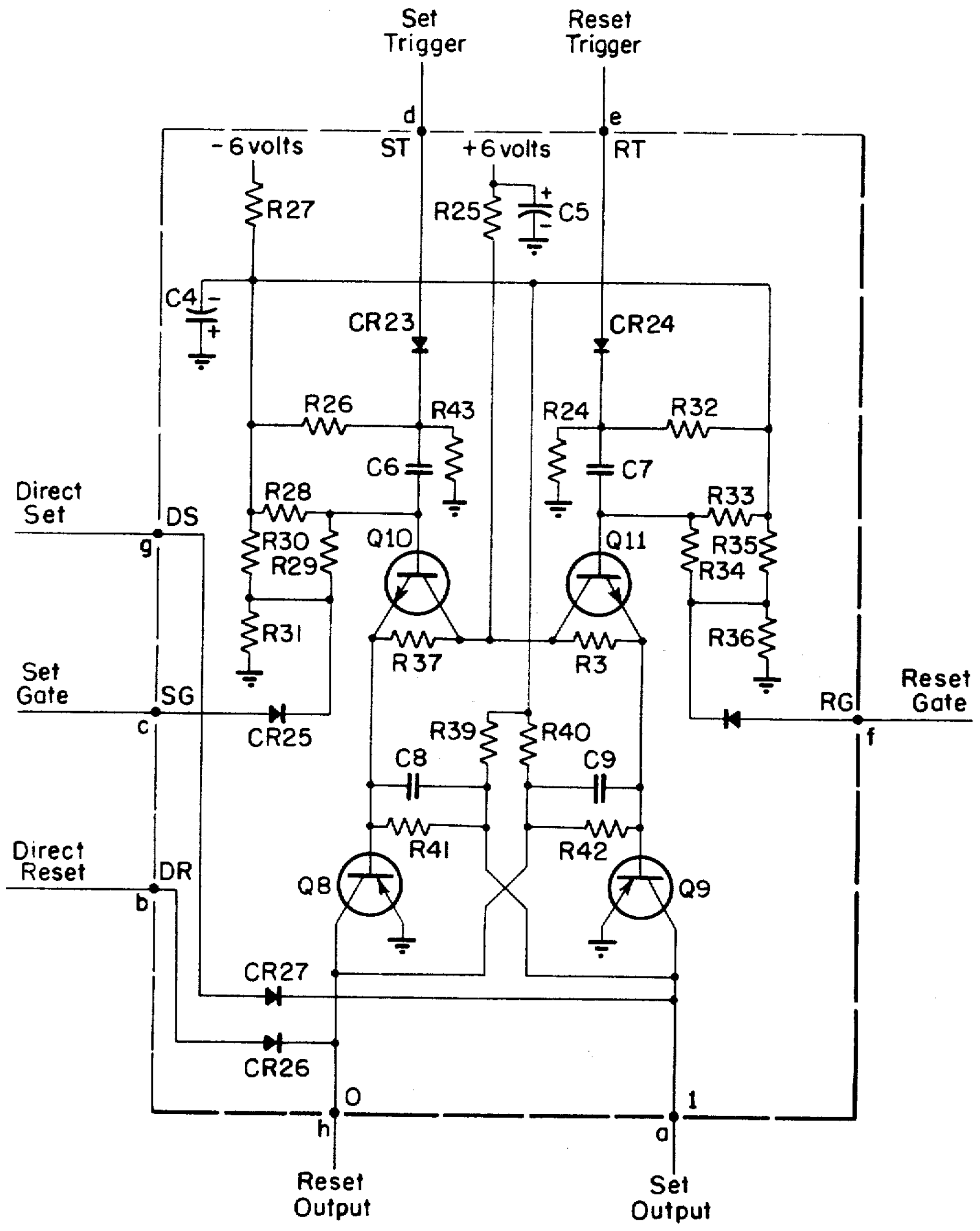
Figure 11:
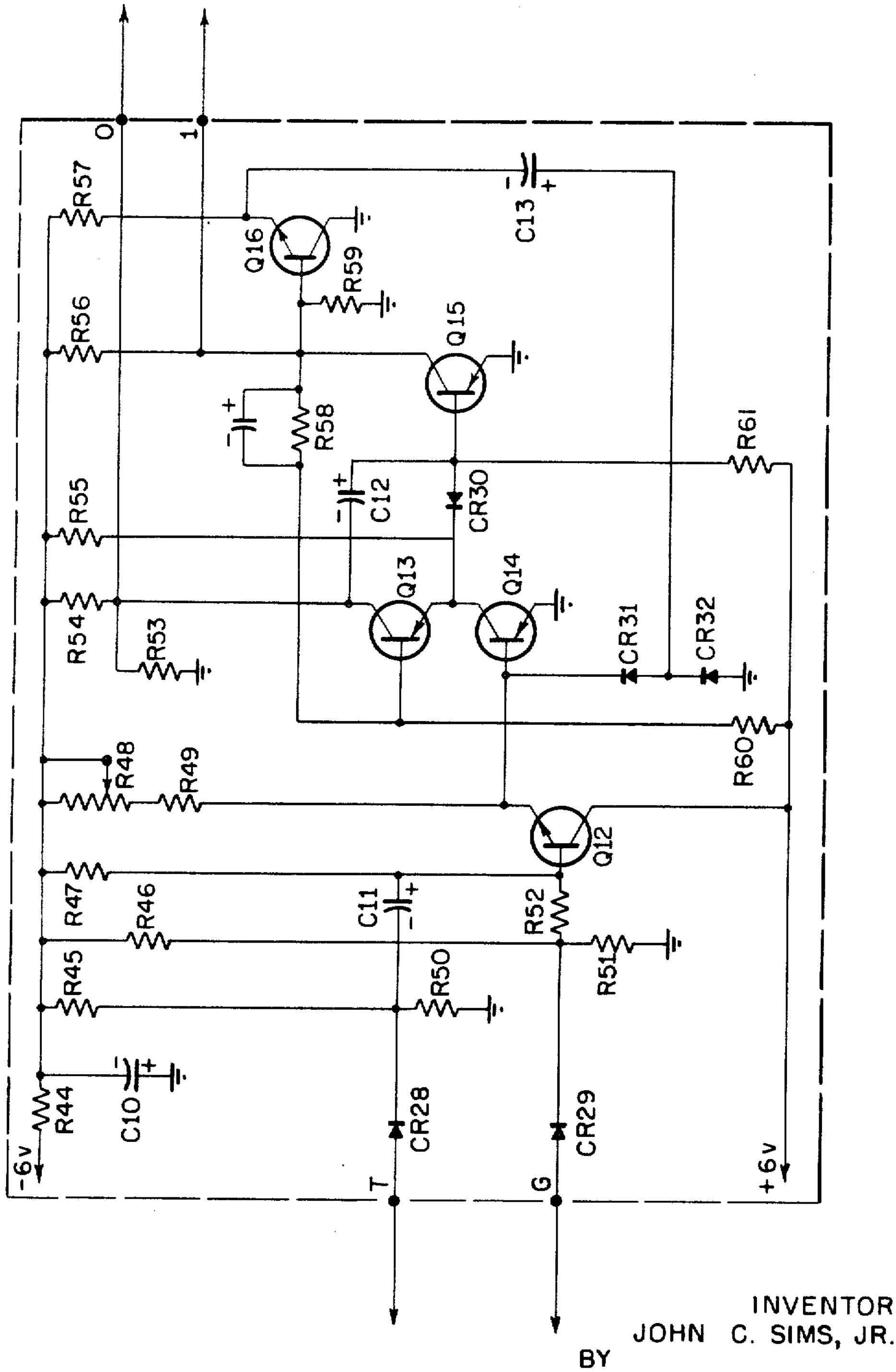

FIGS. 4A, 4B and 4C, when arranged horizontally side by side with FIG. 4A at the left, comprise a wiring diagram of an instruction register used in the system of FIG. 2;

FIGS. 5A through 5C, when arranged horizontally side by side with FIG. 5A at the left, comprise a wiring diagram of two registers and a core plane memory used in the system of FIG. 2;

FIG. 6 is a wiring diagram of an address updating register used in the system of FIG. 2;

FIG. 7 is a wiring diagram of a memory input-output register used in the system of FIG. 2;

FIG. 8 is a wiring diagram of a delayed clock multivibrator suitable for use in the system of FIG. 2;

FIG. 9 is a wiring diagram of a typical circuit suitable for use in the apparatus of my invention to perform various logical functions;

FIG. 10 is a wiring diagram of a bistable register suitable for use in the apparatus of my invention;

FIG. 11 is a wiring diagram of a one-shot multivibrator suitable for use in the apparatus of my invention; and FIGS. 12A, 12B, 12C and 12D are timing charts illustrating the operation of the apparatus of FIGS. 1–11 in storing an instruction word in the instruction register of FIGS. 1, 2 and 4A–4C.

In order to simplify the drawings and facilitate an understanding of the invention, a number of conventions have been adopted. Specifically, in FIG. 2 the lines interconnecting components represent functions, and may correspond in practice to a great number of actual wires. However, in the other figures showing actual wiring diagrams, each line represents a wire. In FIGS. 3 through 6, repeated structural units are shown only once in detail, and repetitions are indicated by blocks which may be assumed to be identical in internal construction to the typical blocks shown in detail. Rather than carry wires throughout the drawings, wires have been labeled with logical symbols indicating their polarity under specified conditions, and each line with the same designation may be assumed to be connected to each other line with the same designation. While it will be apparent that actual polarities can be selected at will, so long as the necessary logical rules are followed, the convention has been used that the (+) symbol to the right of a wire designation, such as M1(+) in FIG. 3, means that the wire is at ground potential, serving as a current sink, when the logical truth value of M1 is 1, or in other words when M1 is true. At other times, a lead so marked can be considered as being open-circuited. Similarly, the (−) symbol to the left of the designation, as (−)M1 in FIG. 3, means that the wire is at a suitable (−) voltage, such as (−)4 volts, or is open-circuited in the case of a NOR gate output, with respect to ground when M1 is true. Such leads may be considered to be at ground potential when the associated logical condition is not true. Thus, any lead marked (−) may be considered open, from the current standpoint, or negative, from the voltage stand-point, while a lead marked (+) may be considered positive, from the voltage standpoint, or a current sink at ground level, from the current standpoint. Various other conventions used to simplify the drawings will be pointed out as the description proceeds.

GENERAL DESCRIPTION

Figure 1:
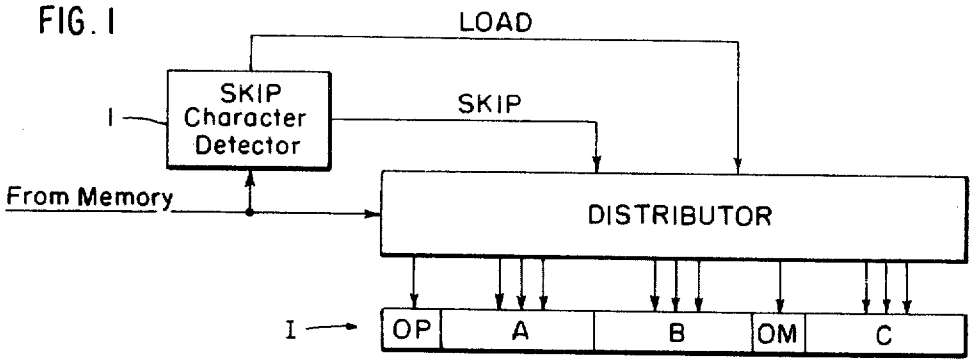
FIG. 1 is a schematic functional block diagram of a preferred embodiment of my invention.

Referring first to FIG. 1, I have illustrated in diagrammatic form the essence of my invention in its broadest aspects. As a specific example, I have illustrated a system employing an instruction register I which has a capacity for storing eleven characters of an instruction word. The first of these is an operation code represented by a single alphanumeric character and defining the operation to be performed. The second is an A address consisting of three decimal numeric characters, and the third is a B address represented by three decimal numeric characters. The fourth location in the I register stores an operation modifier code represented by a single alphanumeric character, employed at times to change or extend the meaning of the operation code. Last in the memory is a C address, consisting of three decimal numeric characters, and defining the address in memory which is to be accessed after the instruction has been executed. Characters are loaded into this instruction register, during the control-word-fill cycle of operation of the total system, sequentially from memory, under the control of a skip character detector 1. The skip character detector responds to the detection of a character coming from memory which is selected for convenience from the available alphabet. I have found it highly convenient to employ the code 00 . . . 01010, sometimes referred to as the "blank" code and symbolized herein by "b," as the skip character. This code has the advantage that it does not interfere with numerical addresses in binary decimal code. If the skip character is not detected, the character that is present is loaded into the instruction register by the distributor. When a skip character is detected, the distributor is instructed to leave the character in the instruction register at the corresponding point unchanged, and to go on to the next character. In the specific embodiment of my invention to be described below, the skip character detector is arranged to control the distributor in such a way that the entire A address, B address or C address, or any or all of them can be skipped, but provision has not been made for leaving unchanged individual characters in these addresses, or for leaving the operation code and operation modifier codes unchanged. However, it will be apparent from the description of the manner in which the most significant digits of the A, B, and C addresses are treated that similar treatment could be provided for individual address characters, and for the operation and operation modifier characters. As an example, assume that the instruction X(121) (bbb) Y(198) is to be entered. In this instruction X is the operation code, 121 is the A address, the B address is to be the previous residual B address as represented by the bbb indicating the skip character code, the operation modifier code is Y and the C address is 198. In the operation of the apparatus of FIG. 1, the previous C address will have been used to access the memory to present the character X to the skip character detector and distributor, and since the operation code is not a skip character, it will be loaded into the instruction register. Similarly, the A address 121 will be loaded into the instruction register. However, when the skip character code in the first character of the B address is detected, the skip character detector will function to prevent the distributor from changing the previous B address. When the Y is presented to the distributor, it will be loaded into the instruction register at the operation modifier location. Similarly, the new C address 198 will be entered into the I register.

Referring now to FIG. 2, I have shown a complete system employing the apparatus of my invention. It should be understood that the digital computer apparatus and peripheral equipment not specifically described in detail may be the same as that conventionally used in known digital computers, the only changes being in the areas specifically described below. For example, the peripheral equipment P may comprise another digital computer or a magnetic tape reader as an input information source, and a high speed printer as an output information sink. In one practical embodiment of my invention, the system is used in just this way to edit the output of a digital computer and supply it to a printer in a desired edited form.

The arithmetic unit A shown in FIG. 2 may be of any known construction, and may include apparatus for performing various functions on data under the command of suitable timing and gating apparatus. This latter equipment is shown in block diagram as sequencing means C, and that portion of it which is essential to the description of my invention will be described in more detail below. As my invention is concerned with the manner in which the instruction register of a digital computer is loaded, the details of the manner in which an instruction is carried out are immaterial, and in any event may be performed by apparatus well known in the art.

The system of FIG. 2 is provided with a memory here shown as a conventional 7 plane, 10 x 100 core-per-plane core memory matrix with a capacity for 1000 alphanumeric characters. It will be understood that this configuration is merely illustrative, and a memory of any desired size or configuration could be employed by suitably extending the capacity of the address register in a known manner. Also, the memory could be of any other suitable conventional construction.

Information is supplied to and taken from the memory matrix by an input-output register M, provided in the illustrative embodiment shown with capacity for one 7 bit character. I prefer to provide for 8 bit characters in practice, to accommodate a parity bit, but have omitted the illustration and description of the apparatus for handling the parity bit because its treatment and use is well understood in the art and may be incorporated in the apparatus of my invention in the same known manner as in other digital equipment. As indicated, "external" data is exchanged with the peripheral equipment and supplied to or taken from the memory matrix by the M register, and in the same manner "internal" data is exchanged between the arithmetic unit and the memory through the M register. These operations may be performed in a conventional manner by conventional apparatus, not shown.

The M register is supplied with information from the memory matrix by a memory address register Q, here shown as having a capacity for a three-character address, each character comprising a number from 0 to 9 in binary-decimal code, and providing output lines for one of ten X addresses and one of one hundred Y addresses to specify the location of the particular character in memory to be supplied to the M register. The Q register is also used to address the memory for writing information from the M register into the core plane memory matrix, both operations being under the control of the sequencing means.

The instruction register I is provided with five sections, as schematically illustrated, for the receipt of the operation code as one character in a section labeled IOP, a three-character A address in a section I1, a three-character B address in a section I2, a one-character operation modifier code in a section IOM, and a three-character C address in a section I3. Characters can be supplied to any of these locations from the M register, as indicated by the transfer symbol M/In, under the control of the sequencing means C.

Information from the I register pertaining to the A, B and C addresses may be supplied to a working register W, which has capacity for the storage of three characters. At a suitable time in the cycle, the information stored in the working register W may be supplied to the memory address register Q, and also to an address-updating register D having a capacity for storing three characters. At a time determined by the sequencing means C, the information stored in the updating register is incremented by one, and then sent back to the working register W. Provision is also made for supplying information from the D register to the I1, I2 and I3 locations in the I register, although only the transfer to the I3 register is important to an understanding of my invention, as the other transfers are made in a conventional manner during the execution of an instruction to advance through fields in memory as operations are performed.

In addition to the skip character detector 1, shown in FIG. 2, the M register provides a signal labeled "Index in M" when a special index bit is present. This bit is one of the 7 bits associated with each character, and is used to mark the beginning and end of fields in the memory. Specifically, an index bit is written into the first character of each instruction word, and the presence of an index bit during the filling of the I register is used to terminate the process and indicate that the next instruction has been reached, whereupon that character is written back into the memory and the instruction register loading process is stopped.

A group mark detector 3 is provided, which is responsive to the information in the M register and is also timed by the sequencing means C, to produce an output level "Group Mark in M" when a specially selected character is encountered indicating the end of a group of fields in memory. In one practical embodiment of my invention the code 1111 was used to represent the group mark. The use of the group mark detector is not essential to the practice of my invention, but is included to illustrate a portion of an instruction execution cycle to assist in illustrating the manner in which the apparatus of my invention is combined and used with conventional apparatus.

As illustrated in FIG. 2, the operation code and operation modifier codes are supplied from the I register to the sequencing means C, where they are used in a conventional manner to define the operation to be performed on the indicated data and set up the necessary circuits to carry it out.

GENERAL DESCRIPTION OF OPERATION

To briefly consider the operation of the system shown and outlined in FIG. 2, assume that a desired program has been stored in a portion of the memory matrix, and that, residual in the I3 portion of the I register, is the C address of an instruction to load fields of data from peripheral equipment. Operation is begun by accessing this location in memory and reading the operation code stored therein, which will have an index bit, into the M register.

The "Index in M" level will cause the sequencing means to begin a control-word-fill cycle and load the operation code, if it not blank, into the IOP section of the I register. The residual C address in the I register will be stored in the W register, then transferred to the D and Q registers. The D register will be incremented, and its contents transmitted to the W register and then to the Q register and the I3 register. The next adjacent memory address will then be accessed, and the second character of the instruction will be received by the M register. Assuming that this character is not blank and has no index point, it will be loaded into the I1 register, as will the next two characters of the A address. After each address is loaded into the M register, the D register updates the address and it is supplied to the W, and thence to the Q and I3 registers, so that the address is advanced at each stage. Depending on the program, it may suffice for a load operation simply to define the address at which the first character of the information to be entered in memory is to be located, so that the B address may be blank, and the operation modifier code may be a blank. Thus, as these characters are read out of memory into the M register, they are not entered into the I register, but the preceding addresses are left in the I register. In the detailed embodiment to be described below, no provision is made for leaving an operation modifier unchanged, however, as the IOM register is cleared whether or not a new operation modifier code is to be written. This construction is not essential, but is convenient where many operation codes do not have associated modifier codes. It may or may not be necessary to load a C address into the I3 portion of the register, to define the next memory location to be entered after the load operation has been completed. If a new C address is not specified, the program will continue from the residual C address. After the last character of the new C address, if any, has been entered into the section I3 of the I register, the next character coming from memory should have an index mark, indicating the beginning of the next instruction word. The index in M level will then be produced by the M register to cause the system to restore that character to the memory and stop the control-word-fill operation. As will appear, provision is made for automatically stopping the operation during the time for entering the eleventh character into the I register whether or not the next character in memory has an index bit.

After the control-word-fill operation has been completed, in the case of the "load" operation here considered, the apparatus C will act under the influence of the operation code "L" in the I register to cause data from the peripheral equipment P to be supplied to the memory matrix through the M register in sequential locations beginning at the A address in the I1 register. During this process, the addresses will be updated by the D register and supplied to the W register and thence to the Q register in the manner described above. After the operation of loading data from the peripheral equipment is completed, the next instruction word, the first character of which is located at the address in the I3 location of the I register, is entered character-by-character into the M register. Any "skip character" detected by the detector 1 will produce a "blank in M" level, causing the preceding information in the I register in that location to be left unchanged. This second control-word-fill cycle will be begun by an index associated with the first character of the instruction word, and will be terminated by an index associated with the first character of the next instruction, in the manner described above.

It will be apparent from the above that operation of the system in the manner described will permit a program to be written in which successive instructions can make use of any of the residual portions of the preceding instruction. This capability of the system makes it possible, if desired, to selectively change or leave undisturbed any character or group of characters in the I register. Thus, in the specific embodiment to be described, addresses remaining after the completion of an instruction may be used in the next succeeding instruction. There are two important advantages of this construction. First, the programmer may operate on variable length fields without the need to program a search for the last character of the field. Secondly, instructions in memory need only specifiy changes in previous instructions, so that greater program storage efficiency is obtained.

SEQUENCING MEANS

Referring now to FIGS. 3A through 3G, the structure and operation of the portion of the sequencing means C of FIG. 2 which forms a portion of the apparatus of my invention will next be described.

Figure 3F:
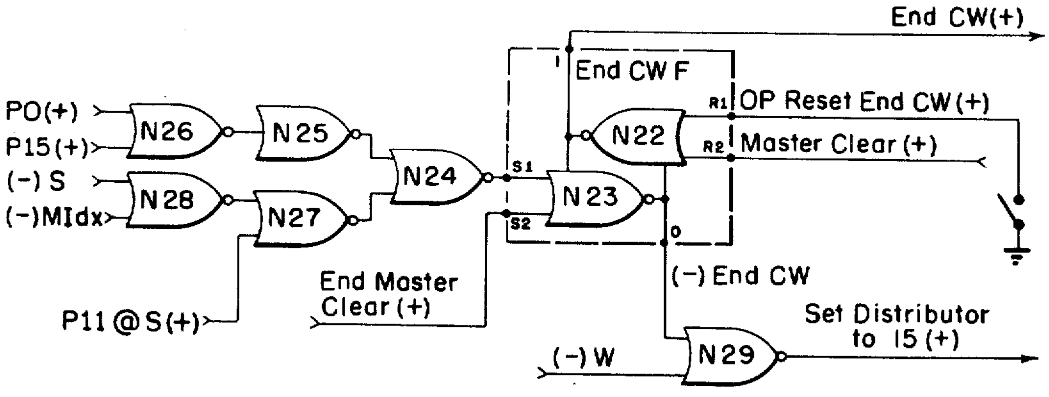
FIG. 3F is a wiring diagram of a portion of the sequencing means of FIG. 2 used to terminate an instruction loading cycle.
Figure 3A:
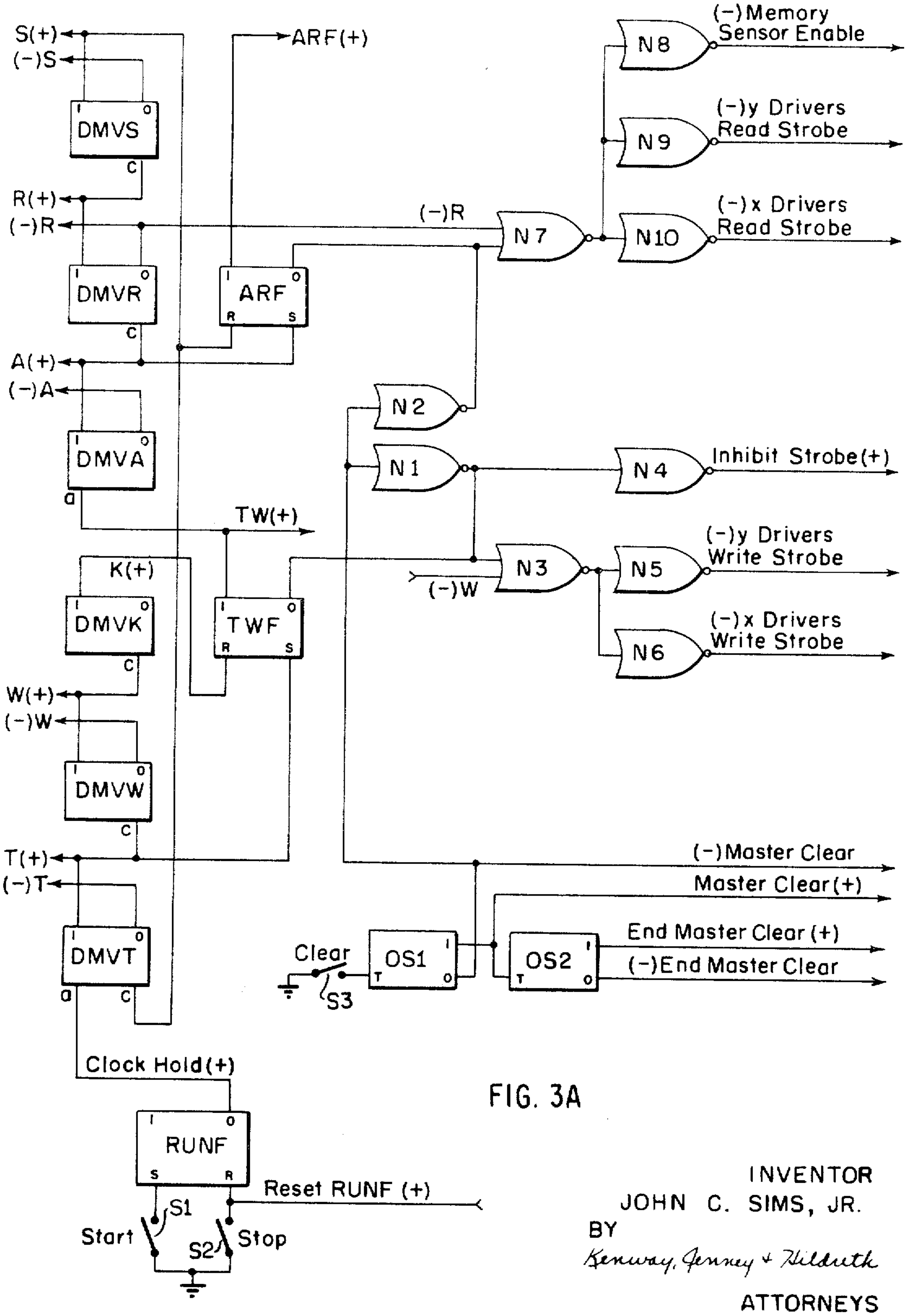
FIG. 3A is a wiring diagram of system timing apparatus forming a part of the sequencing means in FIG. 2 and common to the apparatus of my invention and the conventional apparatus of the system used to execute a stored instruction.

Referring first to FIG. 3A, a basic machine cycle is established by a controlled ring of delayed clock multivibrators which repeatedly produce a sequence of pulses labeled T, W, A, R and S in sequence. A pulse K at a time between the times of the W pulse and the A pulse is also produced, for local control purposes. The delayed clock multivibrators DMVT, DMVW, DMVK, DMVA, DMVR, and DMVS may all be of the same construction, shown in detail in FIG. 8. Since the construction of the multivibrators is essentially conventional, it is included primarily to clarify any questions which may arise about the operation of the system. Basically, each of these multivibrators responds to a negative-going trigger pulse applied to any of its input terminals *a*, while the others of these terminals are either held at a negative potential or are not connected, to produce output pulses a delayed time later at its output terminals 1 and 0. The terminal 1 is normally at a desired negative potential, goes positive during the period of the pulse produced, producing a negative-going transition at the end of the pulse. The terminal 0 is normally at ground potential, and goes negative during the period of the time occupied by the pulse. The length of the pulse is controlled by a capacitor CT, indicated as variable to denote its function in controlling the time delay of the circuit. In practice, when a desired delay time has been established, a fixed capacitor of the proper size is used for the capacitor CT. Suitable typical values for the circuit of FIG. 8, for producing a time delay of 2 microseconds, are given in the following table:

*Table*

E=6 volts
All transistors type 2N964
All diodes 1N995
All capacitors +5%
All resistors ¼ w., 1%, except as noted
C1=10μf, 10 w.v.
CT=500
R1=3.9 ohms, 1 w., 5%
R2=4.64K
R3=1.5K, ½ w., 1%
R4=2.87K, ½ w., 1%
R5=5K variable
R6=196 ohms, ½ w., 1%
R7, R9=820 ohms, 1 w., 2%
R8, R10, R13, R18, R19=1K
R14, R16=5.62K
R17=1.54K Referring to FIGS. 3A and 8, it will be seen that the multivibrator DMVT has a "clock hold (+)" level applied to one input terminal *a* from the logical zero output terminal of a run flip-flop RUNF, to be described. A second input terminal *a* of the multivibrator DMVT has applied to it a level S(+) from the logical 1 output terminal of the multivibrator DMVS. The RUN flip-flop RUNF may be of any conventional construction, such as those to be described below, but for the purposes of the circuit shown should be arranged to provide a ground level current sink at its output terminal 0 and an open circuit at its output terminal 1 when in the reset state, and an open circuit at its output terminal 0 and a ground level current sink at its output terminal 1 when in the set state. The flip-flop is set by application of ground potential to its set terminal S, and reset by application of ground potential to its reset terminal R. When in the reset state, it will thus evidently produce the "clock hold (+)" level, which, applied to an input terminal *a* of the delayed clock multivibrator DMVT, will prevent its operation. Various functions in a complete system might require a number of circuits for setting and resetting the RUN flip-flop under various conditions. However, for purposes of the description of my invention, it is sufficient to illustrate the commencing of the timing cycle by assuming it to be produced by momentary closure of a start switch S1 to momentarily apply ground potential to the input terminal S of the flip-flop RUNF.

The output terminal 1 of the multivibrator DMVT is connected to an input terminal *a* of the multivibrator DMVW, and also to the set terminal S of a flip-flop TWF. The flip-flop TWF may be of any suitable known construction, but preferably comprises a pair of NOR gates connected in front-to-back relation in a manner to be described below. The operation of this flip-flop is the same as that of the flip-flop RUNF, and of other flip-flops to be described, in that it produces a ground level at its output terminal 1 and an open circuit at its output terminal 0 in the set state, and a ground potential current sink at the 0 terminal and an open circuit at the 1 terminal in the reset state. Setting and resetting is accomplished by application of ground potential to the appropriate reset terminals S and R, respectively.

The output terminal 1 of the multivibrator DMVT is also employed to produce the timing signal T(+) for use in other parts of the system, as illustrated, and the 0 terminal is used to produce the signal (−)T. These signals define the time T in the machine cycle, and it will be apparent without further detailed description that the output terminals of the other delayed multivibrators define the times W, K, A, R and S in the timing cycle.

As shown, the 1 output terminal of the multivibrator DMVW is connected to an input terminal of the multivibrator DMVK, and the output terminal of the multivibrator DMVK produces a level K(+) to reset the flip-flop TWF.

The output terminal 1 of the flip-flop TWF is connected to an input terminal *a* of the multivibrator DMVA, and also provides the level TW(+) for timing use in the system. The output terminal 0 of the flip-flop TWF provides a level (−)TW, for purposes to be described.

The output terminal 1 of the multivibrator DMVA provides a level A(+), driving the multivibrator DMVR, and setting a flip-flop ARF, of the same type as previously described. The output terminal 1 of the multivibrator DMVR provides a level R(+) to drive the multivibrator DMVS and perform other functions in the system at R time. The 0 output terminal of the multivibrator DMVR produces a level (−)R at the time R, for use in the system.

The multivibrator DMVS produces the output levels S(+) and (−)S at S time at its output terminals 1 and 0, respectively. The level S(+) is used to set the flip-flop ARF, and its negative-going trailing edge is used to trigger the multivibrator DMVT at the end of S time. The flip-flop ARF produces the levels ARF(+) and (−)ARF, used in a manner to be described.

The operation of the apparatus just described is straightforward. Assuming that the flip-flop RUNF is initially in its reset state, and no timing pulses are being produced, the flip-flops TWF and ARF will be in their reset states and the output terminal 1 of the multivibrator DMVS will be (−). Assume now that the system timing is started by momentarily closing the start switch S1, setting the flip-flop RUNF. The output terminal 0 of the flip-flop RUNF now goes negative, triggering the multivibrator DMVT. A selected time later, the pulses defining the time T are produced by the output terminals of the multivibrator DMVT, and at the end of this time the level T(+) returning negative triggers the multivibrator DMVW and sets the flip-flop TWF. After a further delay, the pulse W(+) is produced, and eventually triggers the multivibrator DMVK. After a selected delay, the time K is defined by the pulse K(+), which resets the flip-flop TWF and causes its output terminal 1 to go negative, triggering the multivibrator DMVA. After a further delay, the pulse A(+) is produced, at the end of which the multivibrator DMVR is triggered, the level A(+) setting the flip-flop ARF. After its inherent delay, the multivibrator DMVR produces the levels R(+) and (−)R, and the level R(+) triggers the multivibrator DMVS when it is restored in a negative-going sense. After its delay, the multivibrator DMVS produces the S pulses, which reset the flip-flop ARF and apply a momentary ground potential to one of the input terminals *a* of the multivibrator DMVT. It will be recalled that the other connected input terminal of the multivibrator DMVT is now at a (−) potential, since the RUN flip-flop is still in its set state. Accordingly, when the level S(+) is removed at the end of S time, this negative-going transition will trigger the multivibrator DMVT to begin the cycle again. The apparatus will continue to cycle in this manner until the flip-flop RUNF is reset. For purposes of describing my invention, this may be assumed to be accomplished by momentarily closing a stop switch S2, applying ground potential to the reset terminal R of the flip-flop RUNF. The "clock hold (+)" level will again be produced when this is done, preventing further cycling of the multivibrators.

It may be helpful in understanding the operation of the system to be described to note that each of the basic cycle times T, W, A, R and S are associated with different functions. Thus, during the time T data is transferred, operations such as clearing of registers are performed. During the time W, information is written into cores in the memory or into the various registers. During the time A, information is shifted from the W to the Q and D registers, and the distributor, to be described, is advanced. During the time R, information is read from the memory into the M register and the address stored in the D register is incremented. The time S is provided to allow settling time, to ensure that data is properly settled in a particular register before it is acted on. Referring again to FIG. 3A, a manually operable switch S3, which may be a spring-returned pushbutton, is employed to initiate a system clear operation when desired. Momentary closure of the switch S3 will apply a ground potential to the input trigger terminal T of a conventional one-shot multivibrator OS1. In a manner known to those skilled in the art, this multivibrator will produce a pulse duration determined by its timing constants, a negative pulse being produced at its output terminal 0 and labeled "(−) Master Clear," and a positive pulse being produced at its output terminal 1 and labeled "Master Clear (+)." The pulse "Master Clear (+)" is employed to trigger another conventional one-shot multivibrator OS2, to produce pulses of predetermined duration labeled "End Master Clear (+)" and "(−) End Master Clear." The duration of these one-shot multivibrators may be selected to be sufficiently long to allow the desired clearing operations to be definitely accomplished. The multivibrators OS1 and OS2 may be of the type shown in FIG. 11, to be described, or of any other suitable conventional design.

As shown in FIG. 3A, the "(−) Master Clear" signal is connected in parallel to input terminals of two inverter circuits N1 and N2. These circuits, like others to be described and shown by the same symbol, may be constructed in the manner described in connection with the typical circuit shown in FIG. 9.

Referring to FIG. 9, a typical circuit is shown which comprises a transistor Q7 of the pnp type having its emitter grounded and its output terminal connected to the output terminal C of the circuit. The base of the transistor Q7 is connected in a voltage divider circuit between a suitable voltage (+)E and a second voltage (−)E, for example, plus and minus six volts with respect to ground, which includes in series the resistors R20, R21, R22 and R23. The resistor R22 is bypassed by a capacitor C2, and the capacitor C3 is connected between the junction of resistors R20 and R21 and ground. One or more input terminals such as *b* are provided which are connected through diodes such as CR20 to the junction of the resistors R21 and R22. One or more direct input terminals *a* may also be provided. The operation of this circuit is such that the transistor QO1 is normally biased to conduction by a negative potential applied between the base and ground. This state of conduction will continue so long as there is no input applied to any of the input terminals *a* or *b*, or if a negative potential is applied to these terminals. However, if ground potential is applied to any of the input terminals *a* or *b*, the voltage at the base of the transistor Q7 will rise and it will be cut off. Thus, the emitter-collector circuit of the transistor QO1 will act as a current sink to an outside source connected to terminal *c* only if there is no ground potential applied to any of its input leads. This configuration may serve as an inverter if only one input connection is made, and as a logical gate if more than one input connection is made. The logical function of the gate may be described as AND or NAND or OR or NOR, depending on the polarities selected to represent the truth values of the inputs. In the system to be described, crossed polarities are used to represent truth values to simplify circuits where possible. Whatever the logical function of the circuit, however, all circuits shown by the symbol for N1 may be of the construction shown in FIG. 9. Comparing FIGS. 9 and 3A, it will be seen that the circuit of FIG. 9 is represented in FIG. 3A by the symbol within which N1 is inscribed, and a circle at the output represents the inverting function of the gate. Since there is a single input for N1 and N2, and the "(−) Master Clear" level is minus when it is on, the outputs of both inverters N1 and N2 are positive or ground level, when the "(−) Master Clear" level is present. These inverters each perform two functions in the system. The inverter N1 output is connected in parallel with the 0 output terminal of the flip-flop TWF to one input terminal of a gate N3, of the construction typified by FIG. 9, and having a second input terminal connected to receive (−)W (the 0 output terminal of the multivibrator DMVW). The gate N3 will accordingly produce an output pulse which is ground level at W time if the flip-flop is set and "(−) Master Clear" is not present. Note that the inverter N1 also serves to reset the flip-flop TWF at the "Master Clear" time. A second connection from the output of the inverter N1 is made to an input terminal of a gate N4 used as an inverter, which produces a level "Inhibit Strobe (+)" at the time when the flip-flop TWF is set, unless "Master Clear" is on. As will appear, the "Inhibit Strobe (+)" signal is used to time the inhibition of a change of state is an addressed core in memory during the "write" time when there is a 0 stored in the M register for that core. Referring briefly to FIG. 5B, as indicated the core plane memory matrix comprises cores threaded by X and Y address lines, Z inhibit lines and a sensing line. During writing, a group of seven cores is addressed by energizing the appropriate X and Y lines each with half write current, and if a one is not to be written, the inhibit line is energized with a minus one-half write current, preventing the state of the core from being changed. In order to make the action of this inhibit winding positive, and returning again to FIG. 3A, the "Inhibit Strobe (+)" signal comes on at T time before the write time W, and goes off at K time after W, so that it will always bracket the address currents.

The address strobes for the memory are provided by the gate N3, which has its output terminal connected in parallel to two inverters N5 and N6. The inverter N5 produces the level "(−)Y Drivers Write Strobe," and the gate N6 produces the level "(−)X Drivers Write Strobe," at W time. These strobes are used in a conventional manner to permit current to flow in any address line selected by the address stored in the Q register.

The inverter N2 serves in cooperation with the flip-flop ARF and the multivibrator DMVR, the latter providing the time signal (−)R, to control the reading of information from memory. For this purpose, the output of the inverter N2 and the signal (−)R are connected to input terminals of a gate N7, producing a ground level output if "Master Clear" is off and the flip-flop ARF is set at R time. The output terminal of the gate N7 is connected in parallel to the input terminals of inverters N8, N9 and N10 to produce the signals "(−) Memory Sensor Enable," "(−)Y Drivers Read Strobe," and "(−)X Drivers Read Strobe" at times when the output of the gate N7 is at ground. The read strobe signals are used in a conventional manner to permit the flow of read current in any of the X and Y address lines selected by the address stored in the Q register at R time, while the "Memory Sensor Enable" signal permits the read amplifiers such as RA1 in FIG. 7, to be described, to respond to the flow of current in the sense windings of the core plane memory matrix.

Figures 3B, 3C:
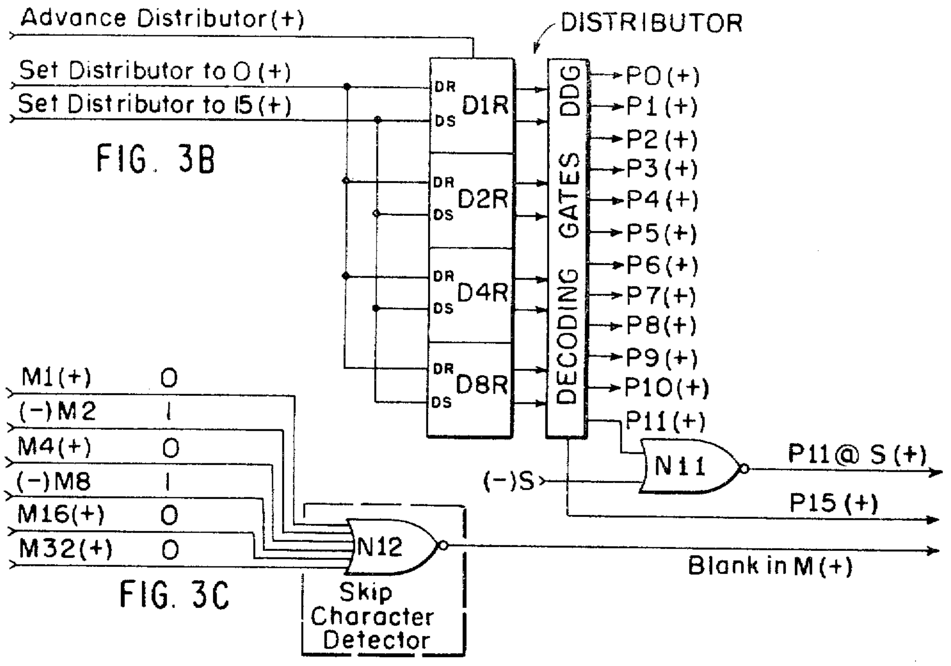
FIG. 3B is a wiring diagram of a distributor incorporated in the sequencing means of FIG. 2 and used to process the operation of the apparatus of my invention and divide operation of the system of FIG. 2 into instruction loading and instruction execution cycles.
FIG. 3C is a wiring diagram of a skip character detector employed at times in the instruction loading cycle of the system of FIG. 2 to modify the operation of the sequencing means.

Referring now to FIG. 3B, a distributor is provided, as a part of the sequencing means of FIG. 2, for producing a sequence of levels on different lines which divide the system operation into a set of phases, during each of which a different operation is performed. This distributor may be of conventional design, and, as here schematically shown, may comprise a conventional four-stage counter composed of registers D1R, D2R, D4R and D8R, which are connected so that they can be directly set over their direct set input terminals DS, directly reset over their direct reset input terminals DR, or stepped as a counter by a level "Advance Distributor (+)" applied to the input trigger terminals of the first stage D1R. Each register may be a conventional bistable multivibrator of the type provided with gate and trigger inputs as well as direct inputs, a suitable circuit for this purpose being shown in FIG. 10. Referring to FIG. 10, a suitable typical register circuit is shown, within the dotted line, having output terminals corresponding to the terminals of the registers of FIG. 3B. Operation and construction of circuits of this type are well known to those skilled in the art and will not be set forth in detail. A table of suitable component values for a typical circuit of this type, suitable for use in the system of my invention, is given below.

*Table*

Transistors Q8 and Q9 are type 2N404
Transistors Q10 and Q11 are type 2N1605
All diodes are type 1N276
Resistors are ½ w., 1%, unless otherwise specified
R24, R26, R30, R31, R32, R35, R36, R43=3.01K
R25=20 ohms, 5%
R27=10 ohms, 5%
R28, R33=23.2K
R29, R34=1.5K
R37, R38=14K
R39, R40=2.43K
R41, R42=2.21K
C4, C5=10, 12 w.v.
C6, C7=300 μμf.
C8, C9=560 μμf.

The operation is briefly as follows:

A ground level applied to the direct set input terminal DS will be coupled to the base of the transistor Q8 through the capacitor C8 and the resistor R41. The transistor Q8 will then be cut off, and its collector will drive the base of the transistor Q9 negative with respect to the emitter, forward-biasing the transmitter and causing it to conduct. The 1 output terminal will then be at ground potential and the 0 output terminal will be at a minus potential. The circuit will remain in this state until some action is taken to reset it, such as the application of a ground level to the direct reset terminal DR. This will produce the opposite effect, in a manner well understood in the art, causing the transistor Q9 to be cut off and the transistor Q8 to conduct. The register may also be set by applying a set gate ground level to its input terminal SG and a set trigger positive-going pulse to its trigger terminal ST. These signals will cause conduction of a normally cut off transistor Q10, and its rising emitter potential will reverse-bias the transistor Q1, causing it to be cut off and setting the register to its set state. Similarly, the register may be reset by a trigger applied to its terminal RT and a gate level applied to its terminal RG, to turn on the transistor Q8 by making the normally cut off transistor Q11 conduct and cut off the transistor Q9.

The manner in which a series of registers such as that shown in FIG. 10 may be interconnected to form a counter required for the distributor in FIG. 3B is well understood in the art, and in any event is shown in more detail in FIG. 6, to be described, where the D register is shown as a series of registers connected as a counter capable of being directly set to any desired count by signals applied to its direct set or direct reset terminals, and capable of being stepped as a counter by an "Increment (+)" level applied in parallel to the set and reset trigger terminals of its first stage. The manner of coupling between stages is also shown in FIG. 6, comprising a coupling of the 1 output terminal of one register such as DU1R to the set and reset trigger terminals in parallel of a following register such as DU2R. The distributor in FIG. 3B may be wired in the same way, except that the additional gating required in the FIG. 6 circuit to allow counting in a binary-decimal sequence, to be described, is not needed in the simple binary counter of FIG. 3B.

Returning now to FIG. 3B, the distributor may be set to a count of 15 by applying the level "Set Distributor to 15(+)" to the direct set terminals DS of its registers D1R, D2R, D4R and D8R in parallel. Similarly, the distributor may be set to 0 by a "Set Distributor to 0(+)" level applied to its direct reset input terminals. It can be advanced by one count by applying a pulse "Advance Distributor (+)" to its set and reset input terminals in parallel.

The 1 and 0 output terminals of the registers D1R through D8R of the distributor are connected to a set of conventional decoding gates DDG, of any suitable conventional construction, which serve to translate the current count of the distributor into the energization of one and only one of the output lines P0 through P11 and P15, the line selected corresponding to the binary count of the distributor. Suitable apparatus for making such a translation is well known in the art, and need not be described in detail here.

Since leads energized at distributor counts of P12, P13 and P14 are not needed, they are omitted. In normal operation, the distributor will be set to P15 at any time other than the time during which the instruction register is to be filled with a control word. When the control-word-fill operation is to be begun, the distributor is set to 0, and thereafter the advance of the distributor is determined by the contents of the M register as characters are strobed into it. A full control-word-fill cycle, placing eleven characters in the I register, will require the stepping of the distributor sequentially from P0 through P11, and in this case the distributor will be reset to 15 at the W time first occurring after P11 is on. For shorter control words that are to be entered into the instruction register, the distributor is reset to 15, ending the control-word-fill cycle, at the W time following the first S time at which an index is found in the M register. As noted above, an index in the M register indicates the beginning of the next instruction word.

Referring again to FIG. 3B, "P11 at S(+)" is generated at S time when P11 is on by the gate N11. This gate is used also in the circuit, as will appear, to ensure that the control-word-fill cycle is ended during P11 whether or not an index is found in the M register. The skip character detector is shown in FIG. 3C as comprising a single gate N12, having six input terminals to which the levels M1(+), (−)M2, M4(+), (−)M8, M15(+) and M32(+) are applied. These levels represent ones in the corresponding 2 and 8 bit weight positions of the M register, and 0's in the 1, 4, 16 and 32 bit weight positions; thus, the gate N12 functions as a NOR gate to produce a ground level output "Blank in M(+)" when all of the applied signals are absent, signifying that the character in the M register is 001010, the skip character in the system of my invention. The level "Blank in M(+)" signifies primarily that the information in the M register is not to be stored in the I register.

Figure 3D:
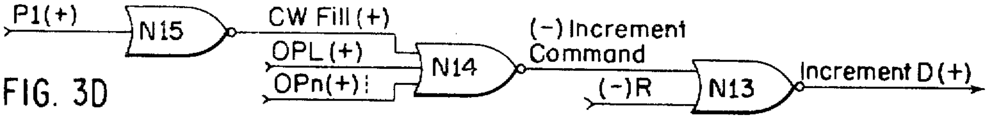
FIG. 3D is a wiring diagram of an address incrementing circuit incorporated in the sequencing means of FIG. 2.

Referring next to FIG. 3D, I have shown a group of circuits for producing an "Increment D(+)" level, which causes the D register contents to be advanced by one to update the C address, thus forming the next address to be accessed. This incrementing signal is produced at R time, as directed by the gate N13 which has one input terminal connected to receive (−)R. The second input terminal of the gate N13 is connected to the output terminal of a gate N14 to receive a level "(−) Increment Command." Thus, the gate N13 is used as an AND gate to produce an output "Increment (+)" level when an increment command is sent at R time.

The increment command signal may be produced in response to any one of a number of operation codes during the instruction execution cycle, by a gate N14, to which any one of a number of suitable operation-code-indicating (+) levels may be applied, the gate N14 serving as an OR gate to produce the "(−) Increment Command" level when any of these operation codes is detected during the operation cycle. During the control-word-fill cycle, a "CW Fill (+)" level is applied to the gate N14 that also serves to produce the "(−) Increment Command" level, so that during control-word-fill the D address is incremented at every R time. The "CW Fill (+)" level is produced by an inverter N15, which receives the P15(+) level from the distributor. Thus, the gate N15 serves to indicate logically that P15 is not present; the only time when P15 is not present is during the control-word-fill cycle.

Figure 3E:
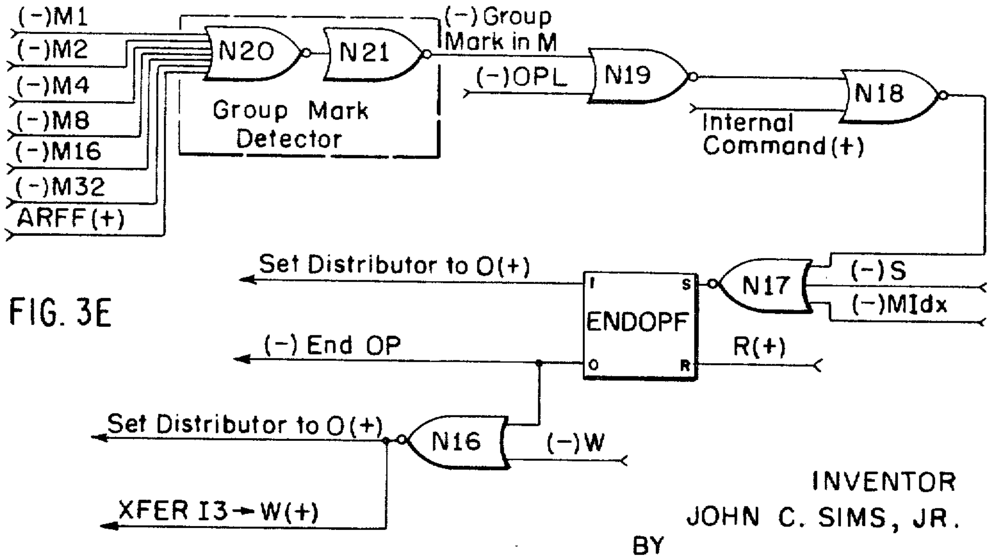
FIG. 3E is a wiring diagram of a portion of the sequencing means of FIG. 2 used to terminate an instruction execution cycle.

The next signal to be considered, referring to FIG. 3E, is the "Set Distributor to 0(+)" level, and a parallel signal, which is the same electrically but which has been labeled "Transfer 13 to W(+)." Note here that for convenience, "transfer" has been abbreviated to "XFER" and "to" represented by an arrow, here and elsewhere in the drawings. The two output signals are produced by a gate N16 which receives (−)W and "(−)ENDOP" and thus serves as an AND gate to produce the labeled output levels when both of these signals are present. The "(−)ENDOP" indication is produced by a flip-flop ENDOPF which may comprise a pair of front-to-back NOR gates connected in a manner to be described below, and which is set by a positive level appled to its set input terminal S at the end of any operation performed by the system comprising the carrying out of an instruction which has been entered in the I register. In other words, after the control-word-fill process has been completed, an operation is commenced which consists in executing the instruction, and when this operation is completed the flip-flop ENDOPF is set. The flip-flop ENDOPF is reset at R time, as indicated by the level R(+) applied to its reset terminal R. At the end of any operation, the character stored in the M register is the first character of the next instruction word, and accordingly carries an index. Thus, the flip-flop ENDOPF can only be set when an index is present. An additional requirement is that it can be set only at S time. This control is exercised by a gate N17, to which the levels "(+)MIdx" and (−)S are applied, such that the flip-flop ENDOPF can only be set at S time when there is an index in the M register. A third input to the gate N17 is provided by a gate N18, which produces an open-circuit level to command to end operation when either an "Internal Command (+)" level is applied to it or a positive level is applied from a gate N19, to be described. The "Internal Command (+)" level may be generated in any conventional manner by apparatus responsive to the completion of operations by the arithmetic unit on the data being processed in compliance with the instruction in the I register for the last instruction. Since the distributor of FIG. 3B will be at P15 during the execution of an instruction, one requirement for the generation of the "Internal Command (+)" level is that the distributor be at P15; this requirement may be satisfied by including the level P15(+) in the gating forming the internal command signal. The gate N19 is included to illustrate a typical internal command that might generate a level "Internal Command (+)", and the illustrated operation is the load operation when information is being strobed into the memory from peripheral equipment. The operation code for this instruction is L, so a "(−)OPL" level is applied to the gate N19. The load instruction normally contemplates the entry into memory of a group of fields of data, which are separated by the group mark 111111. The occurrence of this group mark in the M register is detected by the group mark detector, which comprises two gates N20 and N21. The gate N20 serves as a combined NOR and NAND gate. The logical NAND operation comprises recognizing the group of minus signals M1, M2, M4, M8, M16 and M32, saying that there is a 1 in each location in the M register. The NOR function is provided to ensure that the flip-flop ARF has been reset, and is carried out by introducing the level "ARF(+)" as an extra terminal to the gate N20. Thus, the level "(−) Group Mark in M" is produced when only ones are in the M register at S time after the flip-flop ARF has been reset. The gate N21 serves as an inverter to produce the desired negative level for the gate N19.

The next signals to be considered, with reference to FIG. 3F, are the "END CW(+)" level and the "Set Distributor to 15(+)" pulse, which occur in sequence at the end of the control-word-fill cycle. The "END CW(+)" level is produced at the 1 output terminal of a flip-flop ENDCWF, which has been shown in detail to illustrate its construction and that of the other flip-flops described. As shown, it consists of two gates N22 and N23, the output of one being connected to the input of the other. This configuration has the property that when set with a first gate having its output terminal at positive or ground level, and the second with its output terminal open-circuited, or connected only to a negative potential, it will remain in this condition until its state is changed by a ground level current sink applied to an input terminal of the first gate. Any reasonable number of setting and resetting input terminals may be provided, within limits bounded by considerations known to those skilled in the art, but as here shown two set input terminals S1 and S2 and two reset input terminals R1 and R2 are provided. The set input terminals S1 and S2 are connected to the gate N23, and serve to set the flip-flop to its logical 1 state with the 1 output terminal at ground potential. The reset terminals R1 and R2 are connected to the input terminals of the gate N22, and serve to reset the flip-flop to its opposite state with the 0 terminal at ground potential and the 1 terminal open-circuited. The flip-flop ENDCWF may be set either by the "End Master Clear (+)" level, produced as described above, or by a positive level at the output terminal of a gate N24. The gate N24 produces a positive (current sink at ground) level when negative or open-circuit levels are applied to both of its input terminals. An open-circuit level is applied to the upper input terminal of the gate N24 when a positive level is applied to the input terminal of a gate N25. A positive level is applied to the input terminal of the gate N25 at any time other than P0 or P15. This is assured by the gate N26, to which the levels P0(+) and

P15(+) are applied. To summarize, at times other than P0 and P15, the output of the gate N26 is positive, the output of the gate N25 is open, and the gate N24 is in condition to produce a ground level current sink at its output terminal if an open circuit is presented to its other input terminal. This second input terminal is connected to the output terminal of a gate N27, which produces an output open-circuit level when either the "P11 at S(+)" level is applied, this signal being produced as described above, or an index is in the M register S time, as determined by a gate N28 which receives (−)S and (−)MIdx and has its output terminal connected to the other input terminal of the gate N27. The gate N28 thus serves as an AND gate, and the gate N27 serves as an OR gate. The total function of the networks comprising the gates N24 through N28 in setting the flip-flop ENDCWF may be simply recapitulated, as follows: the control-word-fill cycle occupies all times P0 through P11, and does not occupy P15. It cannot be ended at P0 time, but may be ended at any other time during the cycle by the occurrence of an index mark in the M register at S time. Whether or not an index mark is found in the M register at S time, the flip-flop ENDCWF will be set at S time when P11 is on.

The resetting of the flip-flop ENDCWF occurs on either "Master Clear (+)", derived as described above, on a manually introduced level "OP Reset ENDCW(+)". In practice, this last level is produced by apparatus under the control of the operation code and the sequencing means to reset the flip-flop ENDCWF at the beginning of the instruction execution cycle. The manner in which this may be accomplished will be readily apparent to those skilled in the art.

The 0 output terminal of the flip-flop ENDCWF produces a level "(−)ENDCW" when the flip-flop is set, and this level is applied to one input terminal of a gate N29. Another input terminal of this gate is connected to (−)W, so that the level "Set Distributor to 15(+)" is produced at W time after the flip-flop ENDCW has been set.

Figure 3G:
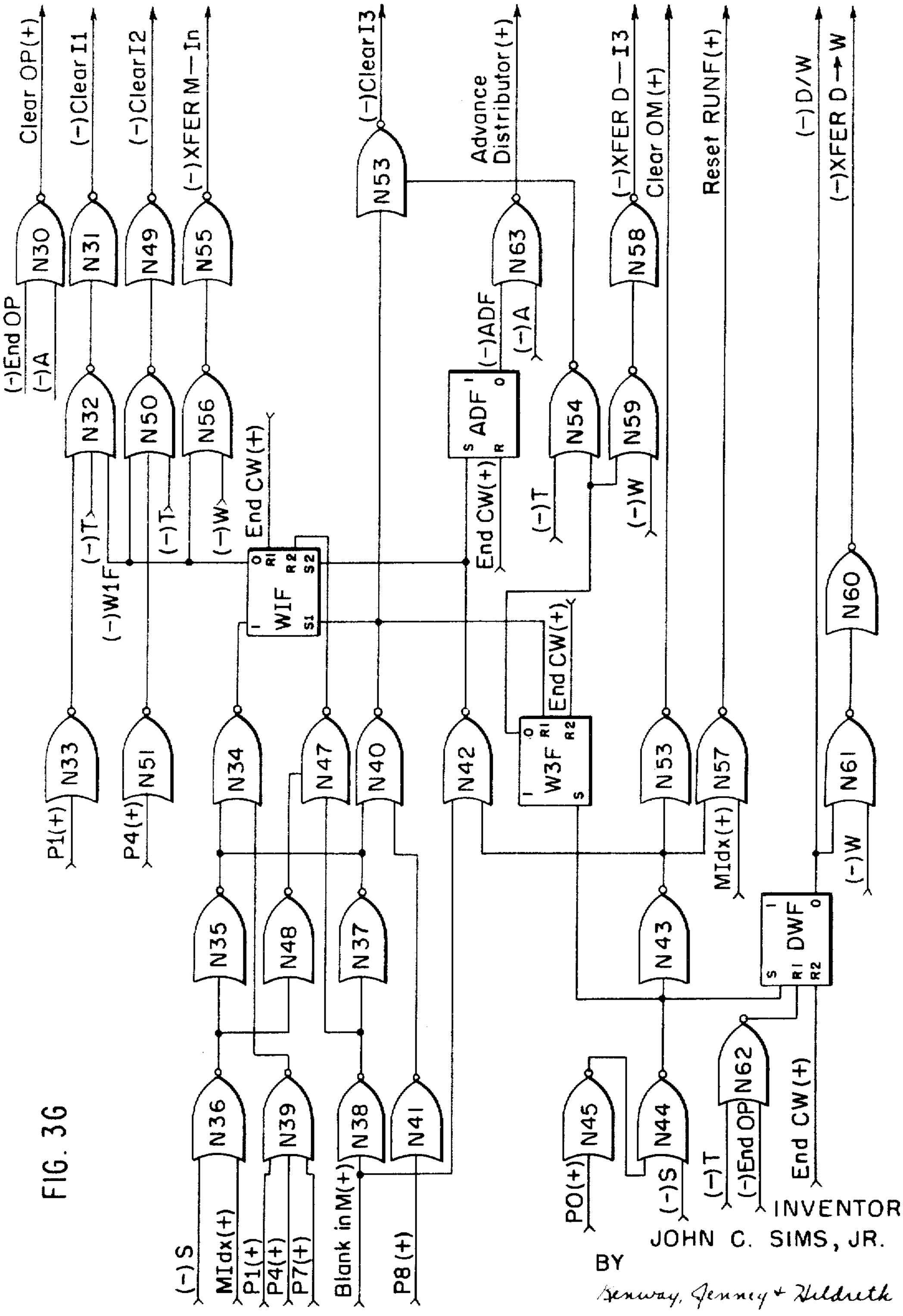
FIG. 3G is a wiring diagram of additional sequencing means of my invention forming a part of the sequencing means of FIG. 2 and serving primarily to control the clearing and transfer of information to various registers during the loading of an instruction.

Referring now to FIG. 3G, the operation code of a previous instruction word is cleared from the I register when the end operation flip-flop ENDOPF is set. This is accomplished by the gate N30, which receives the levels "(−)ENDOP" from the flip-flop ENDOPF, and is done at A time in response to a (−)A level applied to the gate N30.

Referring again to FIG. 3G, the manner in which the various portions of the I register are cleared will next be described. The "(−) Clear I1" level is produced as an open-circuit level by a gate N31. This gate receives a positive output level from a gate N32 at T time when P1 is on and a flip-flop WIF, to be described, is set. Thus, the gate N32 receives an open level at this time from a gate N33, which has an input terminal connected to receive P1(+). The gate N32 also has inputs (−)T and (−)WIF.

The level (−)WIF is provided by the write instruction flip-flop WIF, which may be constructed in the same manner as the flip-flop ENDCWF described above. It will be noted that these flip-flops have the property that they may be set by ground level current sinks applied to their 1 or 0 terminals as well as to their set and reset input terminals. Thus, the flip-flop WIF may be set by the gate N34 drawing current at ground level. This can occur only at S time when there is no index in the M register and there is no blank in the M register, and either P1, P4 or P7 is on. These times correspond to the first character of each of the A and B addressed and the operation modifier character, and indicate that entry may be made in either the I1, I2 or IOM sections of the I register. The condition that the setting be done at S time and that there is no index in the M register is ensured by the gates N35 and N36. The gate N35 will draw current at ground level from the input of the gate N34, preventing the setting of the flip-flop WIF, when an open level is applied to its input terminal by the gate N36. The gate N36 will produce an open level if either an index is present in M, as indicated by the MIdx(+) input, or if it is not S time, as indicated by the absence of the level (−)S.

The condition that the WI flip-flop will not be set by the gate N34 if there is a blank in the M register is ensured by the gates N37 and N38. The gate N37 will produce a current sink output level inhibiting the setting of the flip-flop WIF if an open input is applied to it from the output terminal of the gate N38. The gate N38 will produce an output open level when "Blank in M(+)" is present, indicating an index mark in the M register.

The condition that it be either P1, P4 or P7 time when the flip-flop WIF is set is ensured by the gate N39, which has an output terminal connected to one input terminal of the gate N34 and three input terminals each receiving one of the signals P1(+), P4(+) and P7(+).

A second manner in which the flip-flop WIF may be set is by the production of a positive pulse (ground level current sink) at the output of a gate N40 which has its output terminal connected to the S1 set input terminal of the flip-flop WIF. The gate N40 is inhibited from setting the flip-flop WIF except at S time when there is no index in the M register and no blank in the M register by an input terminal connected to the output terminals of the gates N35 and N37, described above. A second input terminal to the gate N40 provides an open level at P8 time, which corresponds to the time during which a character can be entered into the most significant digit of the C address in the I3 register portion of the instruction register. This level is provided by the gate N41, which receives the signal P8(+).

A gate N42 can also at times set the flip-flop WIf by a connection from its output terminal to the set input terminal S2 of the flip-flop WIF. The gate N42 produces an output level at ground or positive potential at S time in P0 time if there is no blank in the M register. The absence of a blank in the M register is indicated by the absence of the "Blank in M(+)".

The gate N42 receives an open level from a gate N43 at S time during P0. The gate N43 has a single input terminal connected to the output terminal of a gate N44. The gate N44 has two input terminals, one of which receives (−)S; the other receives an open (−) level from a gate N45 at P0 time. The single input terminal of the gate N45 is connected to receive P0(+), as shown.

Provision is made for resetting the flip-flop WIF by the level "ENDCW(+)" from the flip-flop ENDCWF applied to its input terminal R1. A second signal which will reset the flip-flop WIF is applied to its reset input terminal R2, and is supplied from the output terminal of a gate N47. The gate N47 has a first direct input terminal connected to the output terminal of a gate N48. The gate N48 serves as an inverter, to invert the output of the gate N36 as described above. As described, the gate N36 produces a positive output level at S time if there is no index in the M register. If this level is present, the output of the gate N48 is negative and the output of the gate N47 is positive if its second input terminal is negative. The second input terminal of the gate N47 is connected to the output of the gate N38, described above, which produces a negative output level when there is a blank in M, as indicated by the level "Blank in M(+)" applied to its input. The gate N47 thus resets the flip-flop WIF to prevent the clearing of the I register when there is a blank in M not accompanied by an index. Such a condition indicates that the residual address in the I register is to be left unchanged.

The restriction that the flip-flop WIF cannot be set and reset at times P2, P3, P5, P6, P9 and P10 is not essential to my invention in its broader aspects, as provision could be made for setting and resetting at any or all of these times, if desired. For example, to make it possible to retain or change any character in the A, B or C addresses, the inputs to the gate N39 could be replaced by (−)P0, (−)P15 and (−)P8, and inputs P9(+) and P10(+) could be added to the gate N41.

Referring again to FIG. 3G, the level "(−) Clear I2" is produced during P4 time at T time when the flip-flop WIF is set. The level "(−) Clear I2" is produced at the output of a gate N49 which inverts the output of a gate N50. The output terminal of the gate N50 is positive, causing the output of the gate N49 to be negative, at T time as determined by the (−)T level applied to one of its input terminals, when the flip-flop WIF is set, as determined by the level "(−)WIF" being present on the second input terminal, and at P4 time, as determined by a negative level supplied by a gate N51 in response to a level P4(+).

The operation modifier storage section of the I register is cleared by a level "Clear OM(+)" produced by a gate N52 in response to an open-circuit input applied to its single input terminal from the output of the gate N43 described above. As indicated above, this gate produces an output open level at S time during P0 time. Thus, this particular embodiment of the invention does not provide for retaining residual operation modifier codes, but if this feature was desired, it will be apparent that the clearing operation of this portion of the I register could be accomplished in the same manner as the clearing of the hundreds digit of the A, B and C address portions, to provide for retaining residual operation modifier codes if so desired.

The level "(−) Clear I3" is produced by a gate N53. This signal is produced to clear the I3 portion of the I register, in which the C address is stored. This gate N53 is enabled to produce its negative, or open circuit, level during P8 time at T time if a flip-flop W3F, to be described, is set. In detail, a first input terminal of the gate N53 is connected to the output terminal of the gate N40, described above, which produces the output negative level during P8 time at S time if there is no index in the M register and there is no blank in the M register. A blank, signifying "skip character," would direct the apparatus to leave the C address in the I register unchanged.

A second input terminal of the gate N53 is connected to the output terminal of a gate N54. The gate N54 has two input terminals, one connected to receive (−)T at T time, and the second connected to the 0 output terminal of a flip-flop W3F. This flip-flop will produce a negative level, causing the output terminal of the gate N54 to go positive at T time, if the flip-flop W3F is set. Thus, the gate N53 serves as an OR gate to clear the I3 register either at P8 time with no blank in the M register and no index, at S time, or at T time if the W3F flip-flop is set.

The flip-flop W3F may be of the same construction as those previously described, corresponding in structure to the flip-flop ENDCWF, except that it requires only one set terminal. This set terminal is connected to the output of the gate N44, previously described, so that the flip-flop W3F is set at S time during P0 time. The flip-flop W3F is reset by the "ENDCW(+)" level, applied to its input terminal R2, or by a positive level at the output of the gate N40, applied to its reset terminal R1 and signifying that there is no blank and no index in the M register at S time during P8 time.

A level "(−) Transfer M to In," meaning transfer of the contents of the M register to one of the locations in the I register, is produced by a gate N55. This gate inverts the output of a gate N56. The gate N56 produces a positive output, causing the level "(−) Transfer M to In" to be generated by the gate N55, at W time if the WI flip-flop WIF is set. This operation is ensured by the application of the level (−)W to one input terminal of the gate N56, and the level (−)WIF to the other input terminal.

A signal "Reset RUNF(+)" to reset the flip-flop

RUNF, is provided by a gate N57. This signal is produced when there is no index in the M register and the output of the gate N43, described above, is negative. The output of the gate N43 will be negative at S time during P0 time. Since the conditions causing the signal "Reset RUNF(+)" should not occur during normal operation, it may be used to stop the system when an erroneous address is entered, or when there is no index at the proper address.

A signal "(−) Transfer D to I3" is produced by a gate N58. This signal, commanding the contents of the D register to be transferred to the I3 portion of the I register, is produced when the single input terminal of the gate N58 is at ground level. This condition exists at W time if the W3 flip-flop W3F is set. At this time, the levels (−)W and (−)W3F are applied to a gate N59 having its output terminal connected to the input terminal of the gate N58. The signal "(−) Transfer D to W" is produced by a gate N60, which inverts the output of a gate N61. The gate N61 produces a positive level, allowing the gate N60 to produce a negative level, at W time when the flip-flop DWF, to be described, is in its reset state. The flip-flop DWF may be of the type desribed above, having a single set input terminal connected to the output terminal of the gate N44, which, it will be recalled, produces a ground level output at S time during P0 time. The flip-flop DWF may be reset either by a gate N62 having its output terminal connected to the reset terminal R1 of the flip-flop DWF, or by the "ENDCW(+)" level applied to a second reset input terminal R2 of the flip-flop DWF.

The gate N62 has two input terminals, one receiving the level (−)T at T time, and the other receiving a level "ENDOP" when the end operation flip-flop ENDOPF is in its set condition. The 0 output terminal of the flip-flop DWF is also used to produce a level "(−)D/W," used elsewhere in the system.

An "Advance Distributor (+)" level is produced by a gate N63. This level is produced at A time when a flip-flop ADF, to be described, is in its set state. This operation is caused by the application of the level (−)A to the gate N63, and the application of a level "(−)ADF" from the 0 output terminal of the flip-flop ADF to a second input terminal of the gate N63.

The advance distributor flip-flop ADF may be of the same type described above, and has a single set terminal connected to the output terminal of the gate N42 described above. It will be recalled that this gate produces a positive or ground level output at S time during P0 time if there is no blank in M. The flip-flop ADF is reset by the level "ENDCW(+)" applied to its single reset terminal.

THE INSTRUCTION REGISTER

Having described the operation of the sequencing means used in the system of my invention, the various registers and their operations will next be described. First, the instruction register will be described, with reference to FIGS. 4A, 4B and 4C. Referring now to these figures of the drawings, it will be seen that the I register has been shown as a series of groups of units, each labeled to indicate its structure and function. At the top are a number of gates controlling the entry of instructions into the I register and other gates controlling the clearing of the register. The register itself consists of a number of bit registers, each corresponding to a single bit of a single character in the instruction word. At the left, I have shown the bit storage registers IOP1, IOP2, IOP4, and IOP8, which serve to store the binary 1, 2, 4 and 8 bits of the operation code character. Each of these registers, and indeed all of the other registers in the I register, may correspond in detail to the structure of the register IOP2, shown in detail. As shown, the register IOP2 comprises a flip-flop of the kind described above composed of two gates N64 and N65 connected in front-to-back relationship, and the control gate N66. Each of these is a NOR gate of the same construction described above, and shown in detail in FIG. 9. It will be apparent that if the output terminal of the gate N64 is at ground potential, the output of the gate N65 will be negative (not a current sink) and the level (−)IOPR will be produced at the output terminal *d* of the register IOP2, signifying that there is a binary two weight bit in the operation code character. A signal with the same significance but of opposite polarity is produced at the output terminal V, and labeled IOP2(+). Either or both of these signals may be used elsewhere in the system to indicate that there is a bit in this register, the one used being chosen to require the smallest number of gates.

The gate N66 has its output terminal connected to the set output terminal, that is, to the output terminal of the gate N64, of the flip-flop comprised by the gates N64 and N65. This gate will serve to set the flip-flop when a (−)M2 level is applied to its input terminal *h*. As indicated in FIG. 4A, each of the IOP registers, and the other registers in FIGS. 4A, 4B and 4C, are considered to be provided with upper terminals *i* and *h* and lower terminals *e* and *f* which are interconnected in the manner shown for register IOP2. Thus, the input terminal *h* of the register IOP2 is directly connected through the input terminals *f* and *h* of the register IOP1 to the output terminals of a pair of parallel connected gates N67 and N68. These gates N67 and N68 together perform the logical AND function of producing a (−) level only when an "Enter Instruction (+)" level is applied to the input of the gate N68 and a P0(+) level is applied to the direct input terminal of the gate N67. The level (−)M2 indicates that there is a logical 1 stored in the two weight position in the M register, and the gates N67 and N68 act to ensure that this information is entered into the register IOP2 only at P0 time when the enter instruction level is present. The "Enter Instruction (+)" level is provided by a gate N69, which serves to invert the level "(−) Transfer M to In." The enter instruction level is applied to corresponding gates of each of the other character storage sections of the I register.

The flip-flop comprising the gates N64 and N65 in the register IOP2 may also be set by a level "Set IOP2(+)," applied to the input terminal *c* of the register IOP2. This level may be provided manually if desired, or inserted in any other way, but performs no function pertinent to my invention in the operation code storage portion of the I register, it being shown only by way of illustration as corresponding signals are needed in the system in the I1, I2 and I3 register portions.

Clearing of the register IOP2 is accomplished by the level "Clear OP(+)" applied to input terminal *i* of the register IOP1 and thence to its output terminal *e* and through the input terminal *i* of the register IOP2 to the input terminal of the gate N64. Similar provision is made for clearing the other registers in the system. As shown, the level "Clear OP(+)" is provided by a gate N70, the latter serving to invert the output of a gate N71. The gate N71 receives the levels "Clear OP(+)" and "Manual Clear OP(+)," indicating alternate ways of clearing the operation code. The manner in which the "Clear OP(+)" level is generated was described above in connection with FIG. 3. The "Manual Clear OP(+)" level could be generated simply by closing a switch connected to ground to apply a ground level to the gate N71.

It will be seen from the above description that the operation code is stored in the IOP portion of the I register by strobing in the bits of the character then located in the M register at P0 time when the signal "Transfer M to In" is given. Each of the registers IOP4 and IOP8 has a construction identical to the register IOP2, except that the significance of the inputs corresponds to the designation of the register. Accordingly, only the detailed inputs and outputs of the register IOP are shown, since all the others have the same construction.

When it is desired to enter a character from the M register into a portion of the I register, the signals (−)M1, (−)M2, (−)M4 and (−)M8 are presented in parallel to all of the sections of the I register, and the portion into which they are actually entered is determined by the time from P0 to P10. As indicated, the operation code portion of the I register is filled at time P0, by action of the gates N67 and N68 as indicated above. Similarly, the I1 hundreds character portion, corresponding to the most significant digit of the A address, is entered at time P1 by the action of gates N72 and N73 which permit the entry of information into the I1 hundreds portion of the I register at P1 time. Similarly, the gates N74 and N75 permit entry into the I1 tens register at P2 time, the gates N76 and N77 permit entry of information from the M register into the I1 units register at P3 time, the gates N78 and N79 permit entry into the I2 hundreds register at P4 time, the gates N80 and N81 permit entry into the I2 tens register at P5 time, the gates N82 and N83 permit entry into the I2 units register at P6 time, the gates N84 and N85 permit entry into the operation modifier register at P7 time, the gates N86 and N87 permit entry into the I3 hundreds register at P8 time, the gates N88 and N89 permit entry into the I3 tens register register at P9 time, and the gates N90 and N91 permit entry into the I3 units register at P10 time.

Clearing of the I1 section of the I register is accomplished by either of the gates N92 or N93, having their output terminals connected together in an OR configuration, since the "clear" levels supplied to them are negative. Thus, the "(−) Clear I1" level is applied to the input terminal of the gate N92, and a "Manual Clear I1" may be inserted to the input terminal of the gate N93. The manner in which the "(−) Clear I1" level is generated has been discussed above.

The I2 register is cleared by two gates N94 and N95, connected in parallel with the input terminals *i* of the upper registers I2H1, I2T1 and I2U1, and thence in parallel to each of the higher ordered registers in this set, in the manner described in connection with operation code storage portion of the register. Thus, the I2 section of the register is cleared at one time when either the "(−) Clear I2" level, produced as described above, is generated, or a manual clearing operation is directed.

The operation modifier portion IOM of the I register is cleared by a pair of gates N96 and N97, connected in series. The gate N96 serves as an OR gate, to produce a negative output level in response to either "Clear OM(+)," "Master Clear (+)," or "Manual Clear OM(+)." While not shown, the "Master Clear (+)" level could also be included in the gating for the clearing of the other portions of the I register if desired. The gate N97 serves to invert the output of the gate N96 and produce a positive level when any of the clearing signals is present.

The I3 section of the I register is cleared by a pair of gates N98 and N99, connected together in a logical OR configuration such that if a negative input is applied to either of their input terminals, their common output terminal will go positive (draw current at ground potential) and clear the registers I3H, I3T and I3U. The input terminal to gate N98 is connected to receive "(−) Clear I3," generated as described above, and the gate N99 has a lead labeled "(−) Manual Clear I3" which may be activated at any desired time by a manually operable switch, not shown.

THE WORKING REGISTER

Referring next to FIGS. 5A, 5B and 5C, the W register comprises means for storing three characters of an alphanumeric address code. In the illustrated embodiment, the characters may be binary decimal numbers from 0 through 9; in practice, any desired capacity could be provided. The units digit is stored in a series of flip-flops WU1F, WU2F, WU4F and WU8F. Similarly the tens digit is stores in a series of flip-flops WT1F, WT2F, WT4F and WT8F, and the hundreds digit is stored in a series of flip-flops WH1F, WH2F, WH4F and WH8F, the numerical digit in each case indicating the binary weight of the bit stored in the particular flip-flop. These flip-flops may be of the same kind as described in connections with the flip-flop ENDCWF in FIG. 3C, except that they require only one setting and one resetting input terminal.

Each of the flip-flops in the W register is associated with a set of gates which serve at times to set it to its logical 1 state. Thus, the set of gates WU1G serve to set the flip-flop WU1F, the identically constructed set of gates WU2G, shown in block form, serve to set the flip-flop WU2F, and the similar gates shown in block form and identified by the prefix W, a second letter signifying units, tens or hundreds, a third member signifying the binary weight of the bit, and a suffix G indicating the gating function. As indicated in detail for the gate WU1G and shown schematically for the gate WU2G, all of the gates in this series have identical terminals and contain an identical sequence of four gates such as the gates N100, N101, N102 and N103 in the set WU1G. Each set of gates has a terminal *a* connected to an output terminal *j*, a terminal *b* connected to an output terminal *k*, a terminal *c* connected to an output terminal *l*, and a terminal *d* connected to an output terminal *m*. These terminals are not necessary in practice, but are introduced simply to make it easier to show the detailed wiring connections between the gates without drawing a great number of lines. As shown, the output terminals *j*, *k*, *l* and *m* of each gate except the last are connected to the input terminals *a*, *b*, *c*, *d* and *e* of the next succeeding set of gates, such that the output terminals of each of a series of gates N104, N105, N106 and N107 are connected to the corresponding input terminals of all of the gates WU1G through WH8G. The gates N104, N105, N106 and N107 select the register from which the transfer to the W register is to be made. Specifically, the gate N104 serves to transfer the contents of the D register to the W register either when the signal "Transfer D to W(+)" is present, or when "End Master Clear (+)" is present. These two signals are applied to the two input terminals of the gate N104, which at all other times has its output terminal at ground potential. Upon receipt of one of the input signals at ground level, the output goes negative, causing the output of the gate N100 in WU1G to go positive if a one bit is in the lowest ordered units portion of the W register, as indicated by the "(−)D1" applied to input terminal *e* of the gate N100. When the output of the gate N100 goes to ground, the flip-flop WU1F is set. Similarly, the flip-flops WU2F through WH8F are set when the gate N104 produces an output at negative level if the corresponding bits in the D register are logical 1, as indicated by the signals (−)DU2, (−)DU4, (−)DU8, (−)DT1, (−)DT2, (−)DT4, (−)DT8, (−)DH1, (−)DU2, (−)DH4 and (−)DH8 applied to the input terminals of the particular gate set.

The gate N105 serves to transfer the contents of the I1 register to the W register either when the level "Transfer I1 to W(+)" is generated, which will occur during the execution of an instruction stored in the I register, or when a "Manual Transfer I2 to W(+)" level is generated as by grounding the input lead to the gate N105 with a manually actuated switch. Drawing current from either input terminal of the gate N105 at ground level will cause its output terminal to go negative, permitting the output of the gate N101 to go positive if the signal (−)I1U1 is present, indicating that there is a one bit in the corresponding section of the I register. The other bits of the units, tens, and hundred digits stored in the I1 register are likewise transferred at this time.

Similarly, when the output terminal of the gate N105 goes negative, all of the I1 units, tens, and hundreds digits which are a logical 1, as indicated by the presence of a (—) level applied to the terminal *f* of the corresponding gate set, will set the corresponding flip-flops to a logical 1. The (—) input levels applied to the various terminals *f* are identified on the drawings as (—)I1XN, where X is U, T, or H and N is 1, 2, 4, or 8.

The gate N106 serves to transfer the contents of the I2 register to the W register either when the level "Transfer I2 to W(+)" is present, or in response to a manually supplied "Manual I2 to W(+)" signal. When the output of the gate N106 is negative, the output terminal of the corresponding gate such as N102 in the gate set WU1G may go to ground level if its other input terminal, connected to the corresponding output terminal of the I2 register, is negative. For example, when the one weight bit in the I2 units register is logic one, the level "(—)I2U1" will be present at the input terminal *g* and the gate N102 can set the flip-flop WU1F if the output of the gate N106 is negative at that time.

The gate N107 serves to transfer the contents of the I3 register to W either when the signal "Transfer I3 to W(+)" is generated as described above, or in response to a manually supplied "Manual Transfer I3 to W(+)" signal. This gate operates in conjunction with gates such as N103 in the gate set WU1G, each having a second input terminal connected to respond to the corresponding I3 digit in the I3 register. It will thus be apparent that the W register can receive the contents of the registers D, I1, I2 or I3, as selected by the particular transfer signal which is supplied to the gates WU1G through WH8G.

The resetting of the W register is provided by a common "Clear W(+)" signal applied to the reset terminals in parallel of all the registers WU1F through WH8F. This level is provided by a gate N108, which goes to ground when a negative input is supplied from the gate N109 will produce a negative output level when any of its three input terminals are positive. The first of these is a "Manual Clear W(+)" level, which may be generated manually by a switch, not shown. The second is a T(+) which occurs every T time in the operating cycle of the apparatus. The third is the "Master Clear (+)" level, generated as described above.

Referring again to FIG. 3, it will be recalled that the signal "(—) Transfer D to W" occurs at W time, the level (—)W being applied to the gate N61 in the chain forming the level "(—) Transfer D to W." The normal process of updating the W register then, referring back to FIGS. 5A through 5C, is accomplished by clearing the W register every T time and transferring the contents of the D register to it at the following W time.

THE Q REGISTER

Referring again to FIGS. 5A, 5B and 5C, the Q register serves as a memory address register in the system of my invention. This register consists of a series of flip-flops QU1F, QU2F, QU4F, etc., through QH8F, which store the units, tens, and hundreds digits of the address in the W register when an appropriate transfer signal is provided. Each of these flip-flops QU1F through QH8F may be of the same kind as the flip-flops WUIF through WH8F. Transfer from the W register to the Q register is accomplished at A time, when a gate N110, having its input terminal connected to receive A(+), produces an output negative signal enabling the gate set QU1G through QH8G. Each of these gate sets may be of identical construction, the details being shown for the gate set QU1G. Thus, each gate set such as QU1G, QU1G, QU2G, etc., comprises a pair of gates such as N111 and N112, each having one input terminal connected to the output terminal of the gate N110, and a second input terminal connected to a selected output terminal of the corresponding flip-flop in the W register. For example, the logical 0 output terminal of the flip-flop WU1F in the W register is connected to the input terminal of the gate N111, and the logical 1 output terminal of the flip-flop WU1F is connected to an input terminal of the gate N112. Accordingly, at A time the flip-flop QU1F in the Q register will be set to its logical 1 state if the logical 0 output terminal of the flip-flop WU1F is negative, which occurs when there is a one bit stored in the flip-flop WU1F. Similarly, the flip-flop QU1F will be reset if the logical 1 output terminal of the flip-flop WU1F is negative, signifying a logical 0 bit in the flip-flop WU1F. Transfer to the other flip-flops in the Q register is made through the gates QU2G through QH8G in the same manner as described for the transfer through the gate set QU1G.

The memory address function of the Q register is performed by a set of decoding gates QXDG, for the X address, and another set QYDG for the Y address. It is not thought necessary to show the decoding gates QXDG and QYDG in detail, since they may be of conventional construction and serve the purpose of transforming the binary output of the Q register to an energized one of a set of lines corresponding in number to the set of different code states possible in the Q register. Specifically, for the one hundred X address lines, the units and tens digits stored in the QU and QT flip-flops, which can represent one hundred numbers from 0 through 99, are decoded to energize one and only one of one hundred X address lines. Each line threads a different one of one hundred sets of ten cores in each of the seven planes of the core plane memory matrix. Similarly, the ten possible digits 0 through 9 of the Y address stored in the Q register are decoded to energize one and only one of ten Y address drive lines to the core plane, each intersecting one of ten sets of one hundred cores in each of the seven core planes. This addressing apparatus is conventional, and will be well understood by those skilled in the art without further description.

THE D REGISTER

Referring now to FIG. 6, the details of the D register are shown. This register may comprise a set of registers of the type shown in detail in FIG. 10 and described above, interconnected to form a binary counter which may be either jam loaded in parallel or advanced in binary sequence by an "Increment D(+)" signal. As indicated in FIG. 6, a register is provided for each bit of the units, tens and hundreds numerals of a three digit address. The decimal digits of the address may be expressed in binary decimal code, and this necessitates the modification of the register from a standard binary counter to cause resetting of the units, tens and hundreds registers at times necessary to maintain a binary decimal sequence. Specifically, the units set of registers DU1R, DU2R, DU4R and DU8R form a binary counter which counts in normal ascending sequence until the register has in it the code for 9, or 1001. The next succeeding increment pulse is required to reset the units section of the register to 0, since 10 is expressed by zeros stored in this section of the register and by a 1 stored in the one weight binary position of the tens section of the register. This function is performed in the apparatus shown in FIG. 6 by the gates RUG, RTG and RHG, in a manner to be described.

Each register in the units, tens and hundreds portion of the D register may be wired in the same manner shown in detail for the register D1R. Each register may be of the type shown in detail in FIG. 10, where the internal circuits corresponding to the terminal designations in FIG. 6 are shown. Specifically, returning to FIG. 6, the set trigger and reset trigger input terminals of each register are connected together, the logical 1 output terminal is connected to the reset gate input terminal, and the logical 0 output terminal is connected to the set gate input terminal. Thus, the register will change state on each positive-going transition applied to its set trigger and reset trigger input terminals in parallel. As shown, the "Increment (+)" level is applied to the set and reset trigger input terminals of the register D1R, and the logical 0 output terminal of the register D1R is connected to the set and reset trigger input terminals of the register DU2R. The registers DU2R and DU4R are interconnected in the same manner, as are the registers DU4R and DU8R and the other registers for the tens and hundreds digits, except for the interconnections between the units and tens sections and between the tens and hundreds sections, to be described. Assuming that all of the registers are initially set to 0, the first nine "Increment D(+)" levels applied to the register DU1R will cause the registers DU1R through DU8R to step through the binary sequence from 0 to binary 9. Similarly, the tens register section including the registers DT1R through DT8R will step through a normal semi-binary sequence from binary 0 to binary 9 in response to "Carry to T(+)" voltage transitions supplied by an output terminal of the gate RUG, to be described. In the same way, the hundreds registers DH1R, DH2R, DH4R and DH8R will step through a normal binary sequence from 0 to binary 9 in response to "Carry to H(+)" transitions from an output terminal of the gate RTG, to be described. As will appear, the tenth input pulse in each of these register sections causes a different action to take place.

Each of the bit registers in the D register is associated with a gate capable of directly setting it to either its set or its reset state. Thus, the gates DUG1, DUG2, DUG4 and DUG8 are associated with the registers DU1R through DU8R respectively, the gates DTG1 through DTG8 are associated with the registers DT1R through DT8R, and the gates DHG1 through DHG8 are associated with the registers DH1R through DH8R. Each of these gates may be of the same construction as the typical gate DUG1 shown. As shown for the typical unit DUG1, each gate may be considered as having eight input terminals labeled *a* through *h*. The terminal *a* is connected to receive a (−) level if the corresponding digit of the W register is logical 1; for example, the gate DUG1 receives the level "(−)WU1" at its input terminal *a*. Input terminals *b* receive the opposite polarity for the same condition; that is, a positive or ground level when the corresponding digit of the W register is logical 1. Thus, the gate DUG1 receives a level WU1(+). The other inputs for the corresponding gates in the series are shown in FIG. 6. Input terminal *c* of each gate (except the gate DHG8) is connected to its input terminal *h*, so that all of the gates receive the level (−)A applied to the input terminal *h* of the first gate DUG1. An output terminal *c* is not required for the gate DHG8, since it does not lead to another gate. The output terminal *d* of each of the gates except DHG8 is connected to its own input terminal *g*, and the terminals *d* and *g* of each of the units gates DUG1 through DUG8 are interconnected. In a similar manner, the terminals *g* and *d* of the gates DTG1 through DTG8 are interconnected, and the terminals *g* and *d* of the gates DHG1 through DHG8 are interconnected, each of the units tens and hundreds series receiving a different signal input to the top terminal *g*.

The output terminal *e* of each of the gates DUG1 through DHG8 is connected to the direct reset input terminal of the corresponding register DU1R through DH8R. The output terminal *f* of each gate is connected to the direct set terminal of the associated register DU1R through DH8R.

Within each of the gates such as DUG1 through DHG8 are the three gates shown for the typical gate DUG1. These comprise a first gate N113 having input terminals connected to terminals *h* and *a*, and an output terminal connected to terminal *f*. This gate will produce an output ground level to set the register DU1R to its logical 1 state when there is a 1 in the corresponding bit of the W register at A time. A second gate N114 is provided which inverts the level "(−) Reset U" produced by the gate RUG, to be described, to provide at its output terminal a ground level to reset the register DU1R to its logical 0 state. The register DU1R may also be set to its logical 0 state by a gate N115, which has one input terminal connected to input terminal *h* and a second input terminal connected to receive WU1(+). This gate will reset the register DU1R to 0 when there is a 0 in the corresponding position in the W register at A time. Gates corresponding to the gates N113 and N115 in each of the gates DUG1 through DHG8 thus transfer the corresponding bits in the W register to the D register at A time. The gates corresponding to the inverter M114 in gate DUG1 serve to reset the registers to 0 at times determined by the signal applied to the input terminals *g*.

The gate RUG is provided for the units section of the D register to cause the register to be reset to 0 at the tenth count. For this purpose, a gate N116 is provided to detect the presence of count nine, or 1001, in the units register. For this purpose, the gate N116 is provided with four input terminals connected to appropriate register terminals to produce the signals (−)DU1, DU2(+), DU4(+) and (−)DU8. The gate N116 will then produce a ground level at its output terminal when the count of 9 is stored in the register section DU1R through DU8R. This level is applied to the gate input terminal *g* of a one-shot multivibrator OS3.

A multivibrator suitable for use as the multivibrator OS3, as well as for the corresponding multivibrators in the gates RTG and RHG, to be described, is shown in FIG. 11. Referring to FIG. 11, the circuit differs from a conventional circuit only in that both a positive-going transition applied to its trigger input terminal T and a ground level applied to its gate input terminal *g* are needed to cause operation to produce a timed output pulse at its output terminals 1 and 0. Also, a gate storage effect, made use of in the gates RUG, RTG and RHG in FIG. 6, is inherent in the operation of the circuit shown, as will appear.

Specifically, the transistor Q12 is normally non-conducting, its emitter is essentially at ground potential with its base below ground. The transistors Q13 and Q14 are conducting, the transistors Q15 and Q16 are non-conducting, and the capacitor C13 is charged to a potential of about 6 volts. Application of a ground level current sink to the gate input terminal *g* will charge the capacitor C11 until the base-emitter voltage of the transistor Q12 is reduced to about −0.36 volt, enabling a positive-going pulse applied to the trigger input terminal T to turn on the transistor Q12 to initiate the conventional one-shot multivibrator sequence of operation with the transistors Q13 and Q14 turning off, the transistors Q15 and Q16 turning on, and the transistor Q16 again turning off to restore the circuit to its initial state when the capacitor C13 discharges, after a time selected by the time constant of its discharge circuit and adjustable by the potentiometer R48. For use as the multivibrators OS1 and OS2 previously described, the gate input terminal *g* can be permanently connected to ground. For use as the multivibrator such as OS3 in the gates RUG, RTG and RHG in FIG. 6, advantage is taken of the time constant of the circuit including C11, R51 and R52 to make a trigger pulse effective for a short time after the gate level has been removed, since the capacitor C11 remains charged sufficiently to permit a trigger pulse to turn on the transistor Q12 even though the gate level disappears substantially as soon as the trigger pulse is applied. The utility of this gate storage effect will be pointed out below. Suitable typical values for the components in the circuit of FIG. 11 are given in the following table.

*Table*

Transistors Q12 and Q16 are type 2N1605
Transistors Q13, Q14, Q14 and Q15 are type T51658
All diodes are type 1N276 except CR30, which is type 1N816
Unless otherwise specified, all resistors are ½ w., +1%
R44=10 ohms, 5%
R45, R46, R48, R55, R50 and R51=3.01K
R47=23.2K
R48=1K max., 5%
R52=1.5K
R53, R54, R56, R57=1K
R58, R59=2.21K
R60, R61=14K
C10=10μf., 12 w.v.
C11, C12=560 μμf.
C13=.0012

Referring again to FIG. 6, and returning to the description of the gate RUG, the level "Increment D(+)" is applied to the trigger input terminal T of the one-shot multivibrator OS3. With 1001 in the units section of the D register, the gate N116 will apply a ground level to the input terminal G of the multivibrator OS3 until the tenth increment pulse. At the leading edge of this pulse, the units register will attempt to go to 1010, but at the same time the multivibrator OS3 will be triggered to produce an output pulse of suitable duration at its output terminals 1 and 0. The storage effect described above makes it immaterial that the ground level output from the gate N116 will disappear substantially as soon as the level "Increment D(+)" appears. Specifically, the output terminal 0 is normally at ground and will go to a negative potential during the pulse, and the output terminal 1 is normally negative, and will go to ground level during the pulse. Thus, the level "(−) Reset U" will be present for a sufficient time to override the initial trigger and force the units section of the D register to a count of 0000. The logical 1 output terminal of the multivibrator OS3 will produce the level "Carry to T(+)," the leading edge of which will serve in the tens register just as the leading edge of the "Increment D(+)" level served in the units register. Thus, the "Carry to T(+)" level is applied in parallel to the trigger input terminals ST and RT of the first stage DT1R of the tens register and to the trigger input terminal T of a one-shot multivibrator OS4 of the same construction as the multivibrator OS3. If a count of 9 is detected in the tens register by a gate N118 in the gate RTG, the multivibrator OS4 will be triggered to produce the levels "(−) Reset T" and "Carry to H(+)," just as in the units register, to reset the tens register and increment the hundreds register, respectively.

The construction and operation of the gate RHG for the hundreds section of the D register may be identical with those of the units and tens gates RUG and RTG. The lead labeled "Overflow (+)" from the gate RHG corresponds to "Carry to Thousands," and may be used for this purpose if a thousands register is provided. However, it may be desirable to detect this level and use it as an alarm signal if no thousands register is available, indicating that the capacity of the address register has been exceeded.

The logical 0 output terminals of each of the registers DU1R through DH8R are each connected to a different output gate DGU1 through DGH8, as shown. Each of these gates may be identical in construction to the typical gate DGU1 shown in detail in FIG. 6.

As shown, each gate such as DGU1 comprises three NOR gates N121, N122 and N123. Each of these gates has an input terminal connected to the logical 0 output terminal of the register DU1R, to receive the level (−) DU1. Each gate also has a second and independent input terminal. The second terminal for the gate N121 is connected to receive the signal "Transfer D to I1(+)," the gate N122 receives the level "Transfer D to I2(+)," and the gate N123 receives the level "Transfer D to I3(+)." It will thus be seen that the gates DGU1 serve to transfer the contents of the D register to the appropriate section of the I register when the signal to transfer to one of these sections of the I register is given. It will be recalled that these transfer signals are generated at W time. All of the other gates DGU2 through DGH8 have similar output terminals, typical gates DGT2 and DGH8 being labeled, and the labeling on the other output leads will be obvious from these typical examples.

Recalling that the "Increment D(+)" level was formed at R time, it will be seen from the above description that in a normal timing sequence, TWARS, the following events will take place: first, at W time, the current contents of the D register will be transferred to the W register (see FIGS. 5A through 5C), if the flip-flop DWF in FIG. 3G is set, and at the same time the contents of the D register may be transferred to the appropriate section of the I register if the flip-flop W3F in FIG. 3G is set. Next, the contents of the W register are strobed into the D register at A time, through the gates DUG1 through DHG8. At the following R time, the level "Increment (D(+)" will be formed, and the address stored in the D register will be incremented by 1. At the next following W time, this incremented address will be transferred to the appropriate section of the I register if directed by the gates DGU1 through DGH8, or to the W register by the gates shown in FIGS. 5A, 5B and 5C. This sequence of operation provides an updated address at each timing cycle for use in the system when required.

THE M REGISTER

Referring now to FIG. 7, I have shown the M register, which has the capacity for storing seven bits of a character from memory. For convenience in reducing the number of drawings required to show the entire system, I have divided the M register into bit channels, one for each bit of the data stored, and have shown the circuit in detail for the bit weight 1 channel. This channel may be identified as a whole by the characters M1C, and the channels M2C, M4C, M8C, M16C, M32C and MIC may be assumed to be identical in construction to M1C. In practice, an additional bit would be included for parity, but this has not been shown to simplify the description. The bits which are included are the 6 bits having binary weights 1 through 32 required for an alphanumeric character, and the index bit in MIC, which performs the function of locating the most significant digit of words in the memory.

As shown for the channel M1C, each channel is provided with an inhibit winding such as the winding P1I for the channel M1C, which is connected to the output terminals of a suitable conventional write amplifier WA1. The write amplifier is provided with conventional means for rendering it ineffective except when a "(−) Inhibit Strobe" level is provided. This level is produced at the output terminal of an inverter N124, which has its single input terminal connected to receive the "Inhibit Strobe (+)" level. As shown, the channel M1C is indicated as having two interconnected terminals *e* and *h*, while the other channels are similarly provided with terminals *e* and *h*, all being interconnected to receive the level "(−) Inhibit Strobe" when it is present.

The inhibit winding P1I, like the other inhibit windings in the M register, are each threaded through the cores of a single plane in the memory. The 7 planes of the memory each contain one bit per character, so that the inhibit winding P1I is connected to thread the cores of a first plane, the winding P2I is connected to thread the cores of a second plane, and so on. Thus, when the write amplifier WA1 produces current in the inhibit winding P1I, all of the cores in the first plane are inhibited to prevent the writing of a logical 1 in the particular core addressed by the X and Y lines energized at that time. The amplifier WA1 is constructed to produce its inhibit current in the winding P1I when the logical 1 output terminal of the flip-flop M1F, to be described, is negative, indicating that there is a 0 in this position in the M register.

The flip-flop M1F in the channel M1C may be of the same type as those previously described, comprising a pair of NOR gates N125 and N126 connected together in front-to-back relationship as shown. Two reset terminals R1 and R2 and two set terminals S1 and S2 are provided. The logical 1 output terminal of the flip-flop M1F is connected to the write amplifier described above, and also provides a level M1(+) for use elsewhere in the system. The logical 0 output terminal provides a level (—)M1 which is present when there is a 1 stored in the M register bit 1 channel. Each plane in the core plane memory matrix is provided with a sense winding such as a sense winding P1S connected to the input terminals *o* and *n* of channel M1C. Current is produced in this winding when the memory is addressed at R time and there is a 1 stored in the addressed core of the plane to which the sense winding is connected. The current in this winding P1S actuates a read amplifier of conventional construction RA1, to produce a ground level at the input terminal S1 of the flip-flop M1F to set it to its logical 1 state.

Provision is made for setting the M register in response to data other than that contained in the memory to provide for reading information into the memory. Thus, during a load operation when the operation code L is present, external data may be read from peripheral equipment. Also, when it is desired to read into the memory from the arithmetic unit during the execution of an instruction, a "(—) Internal Strobe into M" signal may be provided in a conventional manner, not shown. These various signals are used to set or reset the flip-flops in the M register through a set of gates such as the set MG1 for the channel M1C.

The gates MG1 includes a first gate N129, a second gate N130, an inverter N131 and a third gate N132. The gate N129 has two input terminals, one connected through external terminal *m* of the channel M1C to receive a level (—) OPL, which is produced in a conventional manner in response to the location of the operation code L in the IOP section of the I register during the execution of an instruction. The second input terminal to the gate 129 is connected through external terminal *l* of the channel M1C to a line which is labeled "(—) Read External Data 1 Bit." This line may be energized by peripheral equipment at the appropriate time to read a 1 bit into the M register. When both conditions are present, the gate N129 produces a ground level at its output terminal which is effective to inhibit the gate N130 from producing a ground level and resetting the flip-flop M1F, and is also effective through the inverter N131 to apply a negative level to a gate N132, so that this gate can produce a ground level at its output to set the flip-flop M1F through its second setting terminal S2 if there is also present a level "(—) Internal Strobe into M" at T time, connected to terminals *a* and *j* of channel M1C and correspondingly to the other similarly designated terminals of the units M2C through M1C. This level is also connected to one input terminal of the gate N130.

The terminal of the gate N130 which is connected to the output terminal of the gate N129 is also connected to a terminal *k* and thence to a line labeled "Internal M1(+)" produced by the arithmetic unit in a conventional manner, not shown. This line is energized with a ground potential when it is desired to enter a 1 into the M1 register from the arithmetic unit in the system of FIG. 2.

When an "Internal Strobe into M" is present at T time, and an "Internal M1(+)" in the arithmetic unit is present, the gate N130 will produce a ground level at its output terminal to reset the flip-flop M1F to its 0 state through its input terminal R1.

Provision for clearing the M register at A time is provided by a gate N127, which inverts the level (—)A to provide a (+) signal at the reset input terminal R2 of the flip-flop M1F. A second gate N128 has its output terminal connected to the output terminal of the inverter N127 in an OR configuration, and receives a level "(—) Master Clear," such that the flip-flop M1F may also be reset on the master clear signal. These "Clear M(+)" signals thus applied to the input terminal R2 of the flip-flop M1F are also connected to terminals *b* and *i* of the channel M1C and the corresponding terminals of the other channels M2C through M32C and M1C, whereby similar resetting functions are performed.

In the normal operation of the apparatus shown in FIG. 7, the memory is addressed at R time and the sense windings P1S through P17S are energized if the addressed portion of the register contains a 1 bit. This data is entered directly into the flip-flop such as M1F at R time, so that the contents of the location in the memory are stored in the M register at this time. Recalling the sequence TWARSTWA . . . , which is in force during the normal operation of the system, if the memory is read at R time the M register will contain the information read out until the next following A time, at which time the register will be cleared by the gate N127. At the write time preceding the A time during which the M register is cleared, and in the T time just preceding the W write time, the "Inhibit Strobe (+)" level is produced to allow inhibit current to flow in the inhibit windings of any of the channels of the M register in which a logical 0 bit is stored. It will be recalled that this inhibit current slightly leads and lags the address timing to make sure that the inhibit function is performed. By this arrangement, the contents of the M register are rewritten in the memory each W time.

During the interval from R time to the next following A time, the information stored in the M register is used to load the instruction register, or not, depending on the nature of the character stored in the M register.

SYSTEM OPERATION

Having described the structure of the apparatus of my invention and the manner in which it may be interconnected with the known components of a digital computer system, its operation under typical conditions to fill the instruction register with a control word will be described. For purposes of illustration, it will be assumed that the residual C address in the I register I3 portion is 222. (Any other number could be selected, it only being necessary that some C address be in the instruction register, either from a previous operation or entered manually.) It will also be assumed that at this address in memory there is stored the character 0010101, representing the skip character with an index mark. It will be assumed that at address 223, there is stored the character A corresponding to the operation code for an instruction, and hereinafter written A to indicate by the underlining that it carries an index bit to identify it as the first character of a word. It will be further assumed that at memory locations 224, 225 and 226, there are stored blanks b b b. In the locations 227, 228 and 229 are stored 387, corresponding to a new B address for the instruction. At location 230 there is stored M, an operation modifier code, and at locations 231, 232 and 233 are stored 419, the new C address for the instruction. It will be assumed that at location 234 is stored X, meaning operation code X for a next instruction, with the underline signifying that the character carries an index mark to indicate that it is the first character in an instruction word. The sequence stored in memory for purposes of illustration is thus b A b b b 387M 419X. This sequence may be interpreted as two instruction words, the first comprising a blank operation code, followed by no A address, B address, operation modifier or C address. The instruction b might be used to obtain a desired delay in the program, but is included here primarily to illustrate the operation of the system in response to a blank operation code. The second word is an 11 character instruction word comprising operation code A, blank A address signifying that the residual A address from the preceding instruction is to be retained, a new B address, a new operation modifier code and a new C address. The last character is the first character of the next instruction word, and in the operation of the system it is taken out of memory, recognized, and put back into memory without change, while the control-word-fill cycle is ended.

Figure 12A:
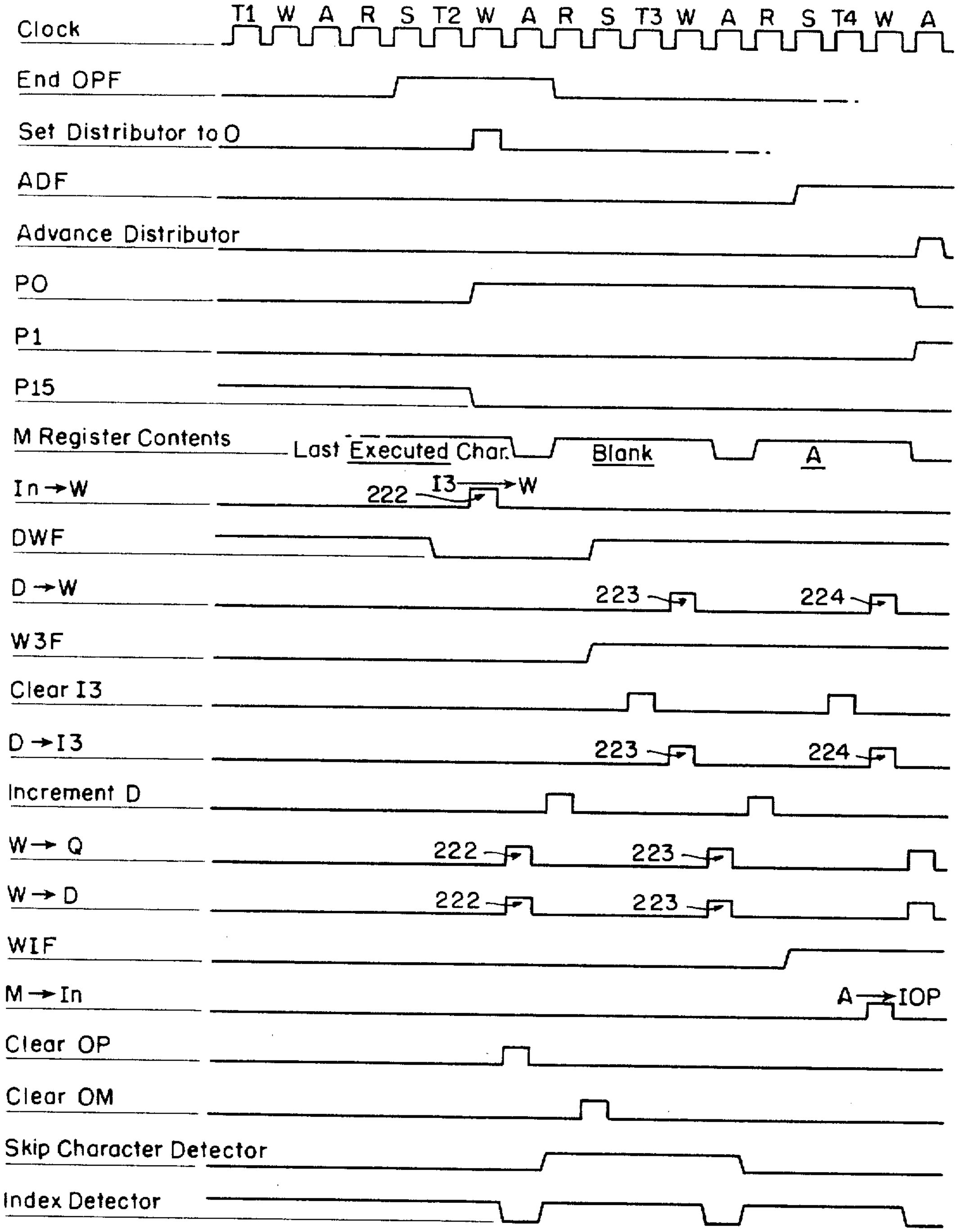

Referring first to FIG. 12A, I have shown at the top a series of clock pulses labeled TWAR and S in the system sequence, with the T's being further characterized by a number indicating the time in the overall cycle. It will be noted that various schematic devices have been used to represent operation in the charts of FIGS. 12A through 12D, and that the blocks do not necessarily represent electrical pulses, but represent states of the apparatus in a manner that will be described. The clock pulses, however, may be considered as representing electrical pulses, though each of the pulses T, W, A, R and S occur on different lines. The times between clock pulses have been compressed somewhat to save space in the drawings, but it may be assumed that each timing pulse has a duration of 1 microsecond and is separated from the next by a duration of 1 microsecond.

As indicated in FIG. 12A, towards the end of the execution of the previous instruction the flip-flop ENDOPF is in its reset state, and the distributor is at P15. The counting times for the distributor are indicated by raising the line associated with a character such as P15 during the time represented by that character and lowering it when the distributor is at some other count. The flip-flop DWF is normally set during this period of operation, and all of the other apparatus of interest is in its inactive status. The first operation that occurs which is of interest to an understanding of my invention is the setting of the flip-flop ENDOPF when the system has finished executing a previous instruction. Referring to FIG. 3E, this will occur at S time when an internal command signal is provided by the apparatus, in a conventional manner not shown, to enable the gate N18 to provide a negative level to permit the gate N17 to provide a positive output level when an index is detected in the M register at S time. There will be an index in the M register at this time, since the last character brought out of the memory in the execution of an operation is the first character of the next field beyond that to be operated on. The flip-flop ENDOPF will then be set, and, referring again to FIG. 3E, the "(−)ENDOP" level applied to the gate N16 in parallel with the (−)W level will cause the distributor to be set to 0 at W time as shown in FIG. 12A. At the same time, the transfer from I3 to W will take place, with the residual C address 222 being transferred to the W register as indicated in FIG. 12A on the line In to W. Referring to FIG. 3B, the "Set Distributor to 0(+)" level will be applied in parallel to the direct reset terminals of the registers D1R through D8R, causing the distributor to be set to a count of 0000 and the output lead P0 from the decoding gates DDG to be at ground potential with the other output leads at a negative potential.

Referring next to FIG. 4C, assuming the residual C address 222 to be stored in the I3 register, there will be 1 stored in the I3H2 register, the I3T2 register and the I3U2 register, such that the levels (−)I3H2, (−)I3T2 and (−)I3U2 will be present at output terminals *b* of these registers. Corresponding output terminals of the other registers will be at ground potential.

Referring now to FIG. 5A, the level (−)I3U2 applied to input terminal *h* of the gate WU2G together with the level "Transfer I3 to W(+)" applied to the gate N107 will cause the flip-flop WU2 to be set to its logical 1 state. Similarly, the level I3T2 applied to input terminal *h* of the gates W2G in parallel with the transfer I3 to W level applied to its input terminal *d* will cause the flip-flop WT2 to be set to its logical 1 state. A corresponding operation will occur in the gates WH2G in response to (−)I3H2 being applied to terminal *h* and "(−) Transfer I3 to W" at terminal *d*, causing the flip-flop WH2F to be set to its logical 1 state. The remaining flip-flops in the W register will remain in their logic 0 states.

As shown in FIG. 12A, when the level P0 goes on, the level P15 will go off. Prior to this operation, at T2 time, with the flip-flop ENDOPF in its set state, the flip-flop DWF will be reset. Referring to FIG. 3G, this action takes place as a result of a ground level applied to the R1 terminal of DWF from the output of the gate N62. At the A time following T2, the M register is cleared. Referring to FIG. 7, this action takes place as a result of the level (−)A causing the output of the inverter N127 to go positive and produce the level "Clear M(+)."

At the same A time, the transfer from W to Q and from W to D is made, with the previous C address 222 being transferred to the Q and D registers at this time. Referring to FIGS. 5A, 5B and 5C, the level A(+) is inverted by the inverter N110 and provides a positive input to the gates QU1G through QH8G, strobing the contents of the M register into the Q register.

Referring to FIG. 6, at A time the gates DUG1 through DHG8 will be enabled, and in the example given the levels (−)WU2 and WU2(+) will be applied to the gate DUG2, the levels (−)WT2 and WT2(+) will be applied to the gates DTG2, and the levels (−) WH2 and WH2(+) will be applied to the gate DHG2. Accordingly, the registers DU2R, DT2R and DH2R will be set to their logical 1 states, and the rest of the D registers will be left in their 0 states.

At the R time following T2, the flip-flop ENDOPF will be reset by the level R(+) applied to its reset terminal R as shown in FIG. 3E. Referring again to FIG. 12A, at this same R time the M register will read the memory at the address 222 stored in the Q register and it will then store the character blank with an index, or b̲. At the same time, the level increment D will be formed, and the address in the D register will be stepped from 222 to 223. Considering these operations in detail, and referring first to FIG. 3A, the "(−) Memory Sensor Enable" will be formed by the gate N8, and the X and Y drivers read strobe pulses will be formed by the gates N9 and N10. The read strobe pulses are applied in parallel to all the X and Y drive lines of the plane, permitting a pair of them selected by the contents of the Q register to be energized. As the character to be read is blank with an index, only the sense winding P7S will be energized, reading a 1 bit into the M index register. This will cause a level "(−)MIDX" to be produced. At the same time, referring now to FIG. 3D, with the level P15 at a (−) potential, the gate N15 will produce "CW Fill (+)," causing the output of the gate N14 to be at "(−) Increment Command." At R time, (−)R will also be applied to the gate N13, causing the "Increment D(+)" level to be formed. Referring now to FIG. 6, this signal will be applied to the input of the DU1 register triggers, causing the register to step from count 0010 to count 0011, or 3. The gates RUG, RTG and RHG will take no part in this operation, and the contents of the tens and hundreds registers will remain the same.

When the M register is filled with a blank and an index, both the skip character detector and the index detector will produce indications. Referring now to FIG. 3C, the skip character detector will produce the level "Blank in M(+)," and referring to FIG. 7, the level "(−)MIdx" will be produced by the register MIC in the M register described above. Referring again to FIG. 12A, the next operation will take place at the S time following T2. At this time, the flip-flop DWF will be set, the flip-flop W3F will be set, and the operation modifier portion IOM of the I register will be cleared. In detail, referring to FIG. 3G, the level P0(+) applied to the gate N45 and inverted and applied to the gate N44, together with the level (−)S applied to the gate N44, will produce an output ground level to set the flip-flop DWF and the flip-flop W3F in parallel. The flip-flop WIF will not be set at this time, since there is a level "MIdx(+)" applied to the gate N36, inhibiting the gates N35, N34 and N40, and the level "Blank in M(+)" inhibits the gate N42. Since the gate N42 is inhibited, the advance distributor flip-flop ADF is not set, and the distributor will accordingly remain at P0. Referring to FIG. 3G, the condition of P0 at S time will act through the gates N45, N44, N43 and N52 to produce the level "Clear OM(+)." Referring to FIG. 4B, the level "Clear OM(+)" will act through the gates N96 and N97 to clear the IOM section of the I register as described above.

The next operation occurring in the cycle of events illustrated in FIG. 12A is the clearing of the I3 portion of the I register at time T3. Referring to FIG. 3G, the "(−) Clear I3" signal is produced at the output terminal of the gate N53 when the output terminal of the gate N54 goes to ground. This occurs when the input of the gate N54 receives (−)T at T time, with the flip-flop W3F set to its logical 1 state and having its output terminal 0 at an open current level. Referring to FIG. 4C, the "(−) Clear I3" level acts on the inverter N98 to produce a ground level to clear the I3 hundreds, tens and units registers.

Referring again to FIG. 12A, at the W time following T3, the transfer from the D register to the W register is made, placing the new address 223 both in the W register and the I3 register. At the A time after T3, the M register is cleared, transfers are made from the W register to the Q register and from the W register to the D register. At the same time, the "Clear OP(+)" level is produced to clear the IOP section of the I register, and indications of the skip character detector and the index dectector are restored.

Referring to FIG. 7, the M register is cleared at A time by means of the gate N127 as described above. The transfer to the Q register is made by means of the gate N110 shown in FIG. 5A, and the transfer gates QU1G thorugh QUH8G in FIGS. 5A through 5C, as previously described. Referring to FIG. 6, the transfer to the D register is made by means of the gates DUG1 through DHG8 in response to a level (−)A applied to the input terminals *h* of these gates. The previous operation code stored in the I register is cleared at the A time following T2. At this time, referring now to FIG. 3G, the gate N30 produces the "Clear OP(+)" level, and this signal clears the IOP section of the I register through the gates N71 and N70 in the manner described above.

Referring to FIG. 7, the levels "(−)MIdx" and "MIdx(+)" are removed when the M register is cleared. These indications are present when and only when there is an index mark in the M register.

At the R time following T3, the M register is loaded again and receives the character A with an index, causing the skip character detector to be restored, causing the index detector to be restored to a condition indicating the presence of an index in the M register.

At the R time following T3, the D register is incremented in the manner previously described. The address stored in D then goes to 224. At the S time following T3, the advance distributor flip-flop ADF and the write instruction flip-flop WIF are set. Referring to FIG. G, the flip-flop ADF is set by ground potential appearing at the output of the gate N42 in response to the absence of the "Blank in M(+)" indication and the occurrence of S time during P0 time as determined by the gates N43, N44 and N45. The same ground level at the output of the gate N42 sets the flip-flop WIF.

At T4, the clear I3 level is generated to clear the previous C address in the I register, in the manner previously described. At the W time following T4, the transfer is made from D to W of the new C address 224, and at the same time the transfer is made from D to the I3 register to store 224 as the new C address. During the same W time, the character A is transferred from the M register to the IOP section of the I register. Specifically, referring to FIG. 4A, with the distributor set at P0 the level P0 is present at the inverter N67 input, so that the output terminal of this gate is forced to an open level. This level is applied to the *h* terminals of the I registers IOP1 through IOP8, enabling the gates such as the gate N66 in IOP2 to pass the corresponding (−)M bit levels, such as the level (−)M2 from the register M2C in FIG. 7, to the corresponding IOP registers. This character A thus forms the new operation code. For simplicity, I have shown only four digits in the IOP register, but it will be apparent that if desired, a larger number could be provided to accommodate more operation codes.

At the A time following T4, the advance distributor level is formed. Referring now to FIG. 3G, this signal is provided by ground level at the output of the gate N63 at A time with the flip-flop ADF in its set state. Referring to FIG. 3B, the signal "Advance Distributor (+)" will cause the registers D1R through D8R to be advanced by 1 count, setting the distributor to P1. At the same time, the M register will be cleared in the manner previously described, and the transfer of the new C address 224 from the W to the Q register and from the W to the D register will be made. The index detector will be restored to no indication.

Figure 12B:
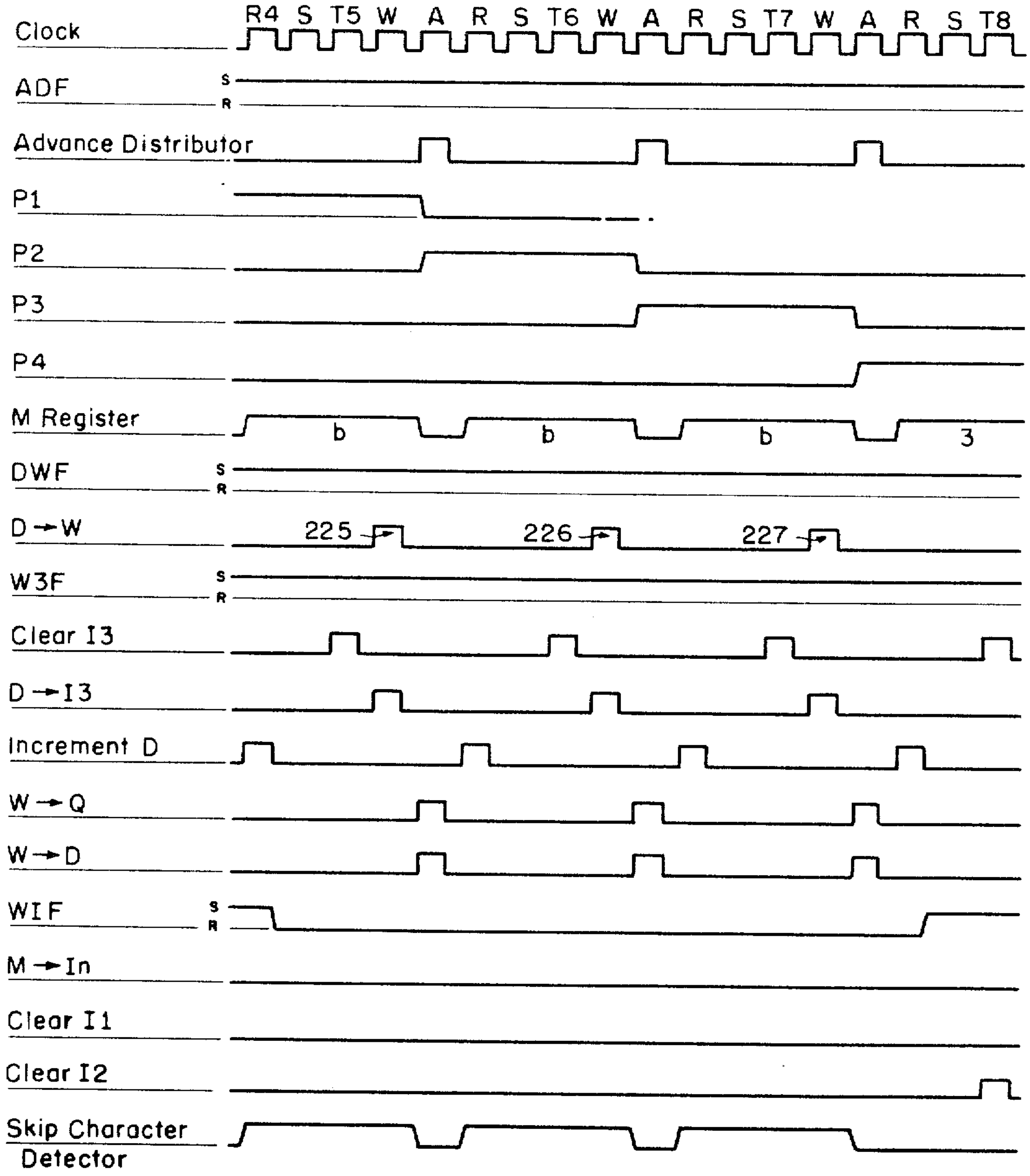

Referring now to FIG. 12B, the R time following T4, labeled R4, is shown. At this time, the character blank (b) is read into the M register and the D register is incremented by the level "Increment D(+)." At the S time following R4, the write instruction flip-flop WIF is restored. Referring to FIG. 3G, with no index in the M register and the occurrence of S time, the output of the gate N36 will be ground level, causing the output of the gate N48 to be open. Since there is a blank in M, the level "Blank in M(+)" will be present, causing the output of the gate N38 to be open. With both input terminals open, the gate N47 will produce an output ground level to reset the flip-flop WIF at its terminal R2. This section is taken to prevent the writing of the contents of the M register into the I1 hundreds register, and permits the residual A address to remain from the previous instruction for use in the next instruction. Had there been no blank in the M register, the character in the M register would have been transferred to the I1 hundreds register at this time.

At T5, the I3 register will be cleared in the manner previously described. At the next following W time, the transfer of the new D address 225 from D to W, and also from D to I3, will be made.

At the A time following T5, the distributor will again be advanced; referring to FIG. 3G, this advance of the distributor will continue so long as the flip-flop ADF is set and will occur every A time while it is set.

Returning again to FIG. 12B, the distributor will be advanced from P1 to P2, and the M register will be cleared. Transfers from W to Q and from W to D will be made at this time, transferring the address 225 to these registers.

At the R time following T5, the next character will be read into the M register from address 225 in the memory, and again will be a blank (b). The D register will again be incremented at this R time, and no further action will take place. At the S time following T5, no action will take place because there is a blank in the M register. At T6, the I3 register will be cleared to receive the new C address 226, and the transfer D to I3 will take place at the W time following T6. A transfer from D to W will also be made at this time. At the A time following T6, the distributor will be advanced from P2 to P3, the M register will be cleared, and the transfers W to Q and W to D will be made, transferring the address 226 to these registers.

At the R time following T6, the next character will be read at address 226 in the memory, and again will be blank. The D register will be incremented at this time, going from 226 to 227. Again, no action will be taken at the S time during T6 because there is a skip character in M. At T7, the register I3 will be cleared, to receive the new C address 227 at the following W time. At this following W time, the transfer from D to I3 and also from D to W will be made.

At the A time following T7, the distributor will be advanced from T3 to T4, the M register will be cleared, and the transfers of address 227 from W to Q and W to D will be made. At the next following R time, the character 3 will be read from the memory at address 227 and the D register will be incremented. The skip character detector will now indicate no skip character in the M register, and the process of filling the new B address into the I2 section of the I register can begin.

At the S time following T7, the write instruction flip-flop WIF will be set. Referring to FIG. 3G, the gate N36 will produce a ground level output because of the presence of the level (−)S and the absence of the level MIDx(+). The Inverter N35 will thus produce an open level, signifying no index in M at S time. With no blank in M, the gate N38 will produce a ground level output, causing the inverter N37 to produce a negative output indicating no blank in M. The inverter N34 will thus produce a ground level output, because its second input terminal is held at an open potential by the presence of P4 plus at the input of the gate N39. Accordingly, the flip-flop WIF will be set by the application of ground potential to its logical 1 output terminal.

At T8, the I3 register will be cleared as described before to allow the entry of the new C address 228. At the same time, the I2 register will be cleared to receive the new B address. Referring to FIG. 3G, the level "(−) Clear I2" is produced at the output of the inverter N49 in response to ground potential at the output of the gate N50. This will occur at T time with the flip-flop WIF set and a level P4(+) applied to the input of the inverter N51. Referring now to FIG. 4B, the level minus clear I2 will be applied to the inverter N94 to produce the level "Clear I2(+)" at the *i* input terminals of the registers I2H1 through I2U8.

At the W time following T8, labeled W8 in FIG. 12C, the transfer of a new address 228 from D to W and also from D to I3 will be made. At the same time, the contents of the M register will be transferred to the I2 hundreds register. Specifically, with code 3 in the M register, the channels M1C and M2C will produce the levels (−)M1 and (−)M2 respectively, while no other channel in the M register will produce a similar output. Referring now to FIG. 4B, the levels (−)M1 and (−)M2 are applied to the registers I2H1 and I2H2, respectively. Entry of these digits into these registers is permitted by the presence of an open level on the input terminals *h* of the registers, produced at the output terminals of the gates N78 and N79 by the presence of the levels P4(+) and "Enter Instruction (+)." The latter is formed by the gate N69 in FIG. 4A in response to the level "(−) Transfer M to In." Referring to FIG. 3G, this signal is formed at the output of the inverter N55 in response to ground potential at the output of the gate N56 occurring at W time with the WI flip-flop set.

At the A time following W8, the distributor will be advanced from P4 to P5 and the M register will be cleared. The transfers of address 228 from W to Q and W to D will also be made at this time.

At the R time following W8, the character 8 will be read from the memory into the M register from address 228, and the D register will be incremented from 228 to 229. At the S time following W8, no action will take place, as the flip-flops WIF and W3F are already set. At T9, the I3 register will be cleared to receive the new C address 229. At the W time following T9, the transfer from D to W and D to I3 will be made in the manner previously described, and the transfer from the M register to the I2 tens register will also be made. This transfer will be made in the manner described for the transfer to the I3 hundreds register, except that in this case the level (−)M8 will be present, indicating the code for 8 or 1000, and the entry of the instruction will occur at P9(+). It will be noted, referring to FIG. 3G, that the level "(−) Transfer from M to In" will occur each W time as long as the WI flip-flop is set.

At the A time following T9, the distributor will be advanced from P5 to P6 and the M register will be cleared. At the same time, the new C address 229 will be transferred from W to Q and from W to D. At the R time following T9, the character 7 will be read into the M register from the memory address 229, and the address stored in the D register will be incremented from 229 to 230.

At T10, the I register will be cleared to receive the new C address 230. At the W time following T10, the transfer from D to W and from D to I3 will be made, transferring the C address 230 to these registers. At the same time, a transfer of the character 7 in the M register to the I units register will be made in the manner described above. As indicated in FIG. 4B, this transfer will take place at P6 time.

At the A time following T10, the distributor will be advanced from P6 to P7, the M register will be cleared, and the transfers from W to Q and W to D will be made. At the next R time, the character M will be read from address 230 in the memory into the M register, and the contents of the D register will be incremented from 230 to 231. At T11, the I3 register will be cleared, and at the W time following T11 the contents of the D register will be transferred to the W and I3 registers and the character M will be transferred to the IOM section of the I register. Referring to FIG. 4B, it will be seen that this action takes place at P7 time under the influence of the gate N84, the level "Enter Instruction (+)" being present at the input of the gate N85 at this time as previously described.

At the A time following T11, the distributor will be advanced from P7 to P8, the M register will be cleared, and the transfers from W to Q and W to D registers will be made. At the R time following T11, the character 4 from address 231 in the memory will be read into the M register, and the contents of the D register will be incremented from 231 to 232.

Figure 12C:
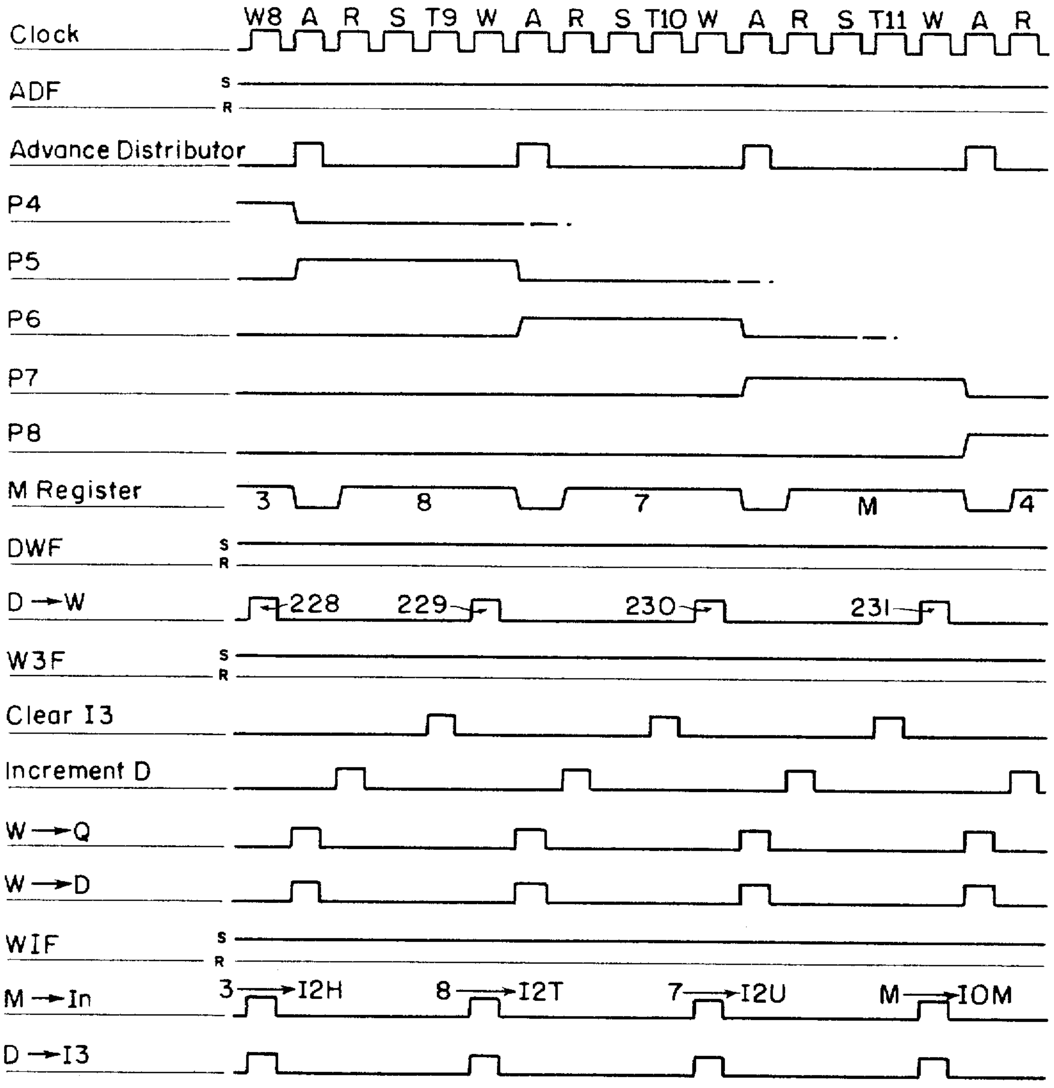
Figure 12D:
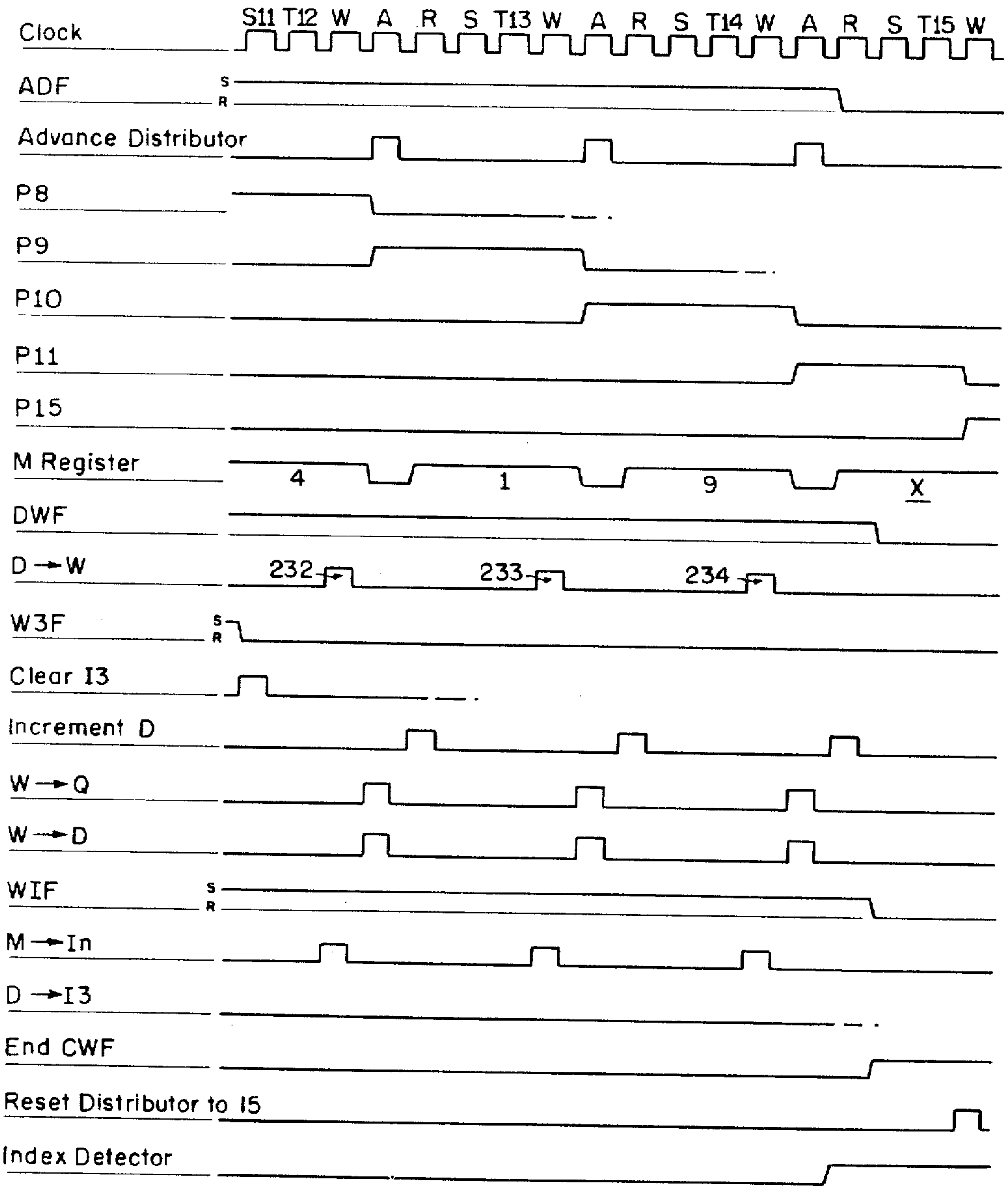

Referring now to FIG. 12D, the timing cycle begins at S11, the S time following T11 in FIG. 12C. The distributor is now at P8 and there is a 4 in the M register. At S11, the I register is cleared and the flip-flop W3F is reset. Referring to FIG. 3G, the level P8(+) applied to the input of the inverter N41 will produce an open input to the gate N40. The second input of the gate N40 will be open, because there is no blank in M as indicated by the gates N37 and N38, and there is no index in the M register at S time as indicated by the outputs of the gates N36 and N35. Thus, the potential at the output of the gate N40 will be positive ground level, causing the flip-flop W3F to be reset over its reset terminal R1. At the same time, the presence of ground potential at the output of the gate N40 will cause the the gate N53 to produce a (−) Clear I3 level, at S time instead of at T time as previously.

At the W time following T12, the address 232 will be transferred from D to W, but not from D to I3 as before. Instead, the C address for the new instruction will be entered from M to I3. Referring to 4C, the level "(−) Transfer M to In" will be produced at the output of the inverter N55 in response to ground potential appearing at the output of the gate N56. This output will occur at W time with the WI flip-flop set. Referring now to FIGS. 4A through 4C, with the level "(−) Transfer M to I" at the input of the inverter N69, the level "Enter Instruction (+)" level will be applied to the gate N87 to produce an open level at the terminals *h* of the I3 hundreds register, since with the P8 (+) level applied to the input of the gate N86 this action is not inhibited. The character 7 stored in the M register will be strobed into the I3H1, I3H2, I3H4 and I3H8 registers. Since the code is 7, a 1 will be stored in I3H1, I3H2 and I3H4, and a 0 will be stored in I3H8.

At the A time following T12, the distributor will be advanced from P8 to P9, the M register will be cleared, and the transfer from W to Q and W to D registers will be made.

At the next following R time, the character 1 will be read from address 232 in the memory into the M register, and the D register will be incremented. At the W time following T13, the transfer of the address 233 from D to W will be made, and the character 1 will be transferred from the M register to the I3 tens register. As indicated in FIG. 4C, this transfer will take place at P9 with the "Enter Instruction" level present at W time as described above.

At the A time following T13, the distributor will be advanced from P9 to P10, the M register will be cleared, and transfers will be made from the W register to the Q and D registers. At the R time following T13, the character 9 will be read from memory address 233 in the M register, and the contents of the D register will be incremented from 233 to 234.

At the W time following T14, the contents of the D register will be transferred to the W register and the character 9 will be transferred from the M register to the I3 units register. The manner in which these transfers are made will be apparent from those previously described.

At the A time following T14, the distributor will be advanced from P10 to P11 and the M register will be cleared. The address 234 will be transferred from the W register to the Q register and from the W register to the D register as before. A complete new instruction, including a new operation code, the residual A address, the new B address, the new operation modifier code and the new C address have now been stored in the I register, and it is only necessary to terminate the control-word-fill operation.

At the R time following T14, the next character is read from memory at address 234. This character is X, meaning "operation code X carrying an index," as indicated by the underlined X in FIG. 12D. The index detector will now produce an indication and the levels (−)MIdx and MIdx(+) will be produced. The D address will be incremented as before. At the S time following T14, the flip-flop DWF will be reset, the write instuction flip-flop WIF will be reset, and the flip-flop ENDCWF will be set. Referring to FIG. 3F, the flip-flop ENDCWF will be set by a ground level at the output of the gate N24. This occurs when both of the output terminals of the inverter N25 and the gate N27 are open. The inverter N37 has an open output at this time because ground level is applied to the output terminal of the gate N26, neither P0(+) nor P15(+) being present. The output of the gate N27 will be negative because both the input "P11 at S(+)" is present and the levels (−)S and (−)MIdx are present at the inputs of the gate N28. Acordingly, the flip-flop ENDCWF will be set to produce the level ENDCW(+). Referring now to FIG. 3G, the flip-flop WIF will be reset over its input terminal R1, and the flip-flop W3F will be reset over it input terminal R, the flip-flop DWF will be reset over its input terminal R2, and the advance distributor flip-flop ADF will be reset over its input terminal R. At the W time following T15, the level "Set Distributor to 15(+)" will be formed at the output of the gate N29 in FIG. 3F, at W time with the ENDCW flip-flop in its set state. The distributor will then be reset to 15 and the execution of the instruction in a conventional manner can be carried out. The distributor will remain set to P15 during the execution of the instruction, and after the instruction is executed a new control-word-fill operation will be begun by the setting of the flip-flop ENDOPF in the manner previously described.

It is believed that the operation of the apparatus of my invention to enter instructions programmed in the manner described will be clear from the typical examples illustrated, since both residual and new addresses have been included in the second illustrative instruction. While in the embodiment described, only A address, B address, or C address residuals may be used in writing instructions, it will be readily apparent that by examining each character for blanks any digit of any instruction could be maintained residual, and by examining operation modifier codes in a similar manner, it would be possible to use residual operation codes. However, the system as shown and described has proved to be most suitable for practical use.

While I have described my invention with respect to the details of a particular preferred embodiment thereof, many changes and variations will be apparent to those skilled in the art upon reading my description, and such may obviously be made without departing from the spirit of my invention.

Having thus described my invention, what I claim is:

1. In combination with an internally programmed information processing system having an instruction register for storing an instruction word comprising at least two characters, addressable memory means for storing a sequence of characters defining an instruction word, distributing means for sequentially reading the stored sequence of characters from said memory means a character at a time and restoring each character to the address in said memory means from which it was read after a predetermined time, skip character detecting means having first and second states and actuated by a predetermined skip character read by said distributing means from its first to its second state, and means controlled by said distributing means and said skip character detecting means in its first state for entering characters other than skip characters into said instruction register.

2. In combination, memory means for storing a sequence of characters at different addresses, an input/output register for storing a character, an instruction register for storing a series of characters defining an instruction, sequencing means for sequentially reading a series of characters from sequential memory addresses in said memory means into said input/output register a character at a time and writing each character back into the memory means before reading the next character, detecting means controlled by the input/output register to a first state or a second state according as there is or is not a predetermined character stored in said input/output register, respectively, and means controlled by the input/output register and the detecting means in its second state for entering characters stored in said input/output register other than said predetermined character in said instruction register.

3. In combination, memory means for storing a series of characters encoded in a manner distinguishing the first character in an instruction word from other characters in the word by an index bit added to the code for the first character in each word, timing means for periodically producing a predetermined sequence of discrete time signals including at least a first signal W, a second signal A and a third signal R, distributing means settable to a first state P0 and a final state P*n* and sequentially actuable by a series of applied signals from the state P0 to a group of states equal to one less than a selected maximum number of characters in an instruction word, a first register for storing a character, a second register having a character storage register position for said selected maximum number of characters, code detecting means controlled by said first register and actuated to a first or a second state according as said first register is or is not storing a preselected character, respectively, index detecting means controlled by said first register to a first or a second state according as the index bit is or is not stored in said first register, respectively, sequencing means under the control of said timing means for reading successive ones of the characters stored in said memory means into said first register in response to each R signal, and restoring the character in said first register to said memory means in response to the next W signal, means enabled by the distributing means in its P$n$ state and controlled by said index detecting means in its first state for setting the distributing means to its P0 state, means controlled by the distributing means in its P0 state, said first register, said timing means, and said code-detecting means in its second state for storing the character stored in said first register in the first character storage portion of said second register in response to the W signal first occurring, a third register actuable to first and second states, means controlled by said distributing means in its P0 state and said code-detecting means in its second state for actuating said third register to its first state, means controlled by said third register in its first state and said timing means for actuating said distributing means to a different state once for each A signal following the last recited W signal, means controlled by said first register, said timing means, said distributing means, and said code-detecting means in its second state for storing the contents of the first register in successive register positions in the second register determined by the state of the distributing means, once for each W signal following the first of the last recited A signals, and means controlled by the index detecting means in its first state and the distributing means in a state other than P0 and P$n$ for actuating the distributing means to its state P$n$ and actuating said third register to its second state.

4. Information processing apparatus, comprising, in combination, an instruction register comprising a series of character signal registers for storing the characters of an instruction word, a source of instruction words comprising sequences of character-defining signals, means for sequentially examining character signals from said source and producing a control signal when a character under examination is not a preselected character, distributing means synchronized with said character signal examining means and actuated to a different one of a number of successive states corresponding to the character capacity of said instruction register once for each character examined, and means actuated by said control signal and said distributing means for entering examined characters into character registers in the instruction register selected by the state of the distributing means.

5. In combination with an instruction register for an internally programmed information processing system, the instruction register comprising addressable character storage locations for a predetermined number of characters of an instruction word, distributing means for sequentially addressing the character storage locations of said instruction register, a source of character signals synchronized with said distributing means for sequentially producing a series of character signals, detecting means controlled by said source and actuated to a first or a second state according as said character signals do or do not correspond to a predetermied character, respectively, and means controlled by said source, said distributing means and said detecting means in its second state for storing characters not the same as said preselected character in locations in the instruction register selected by said distributing means.

6. In combination with a digital data processing system having an instruction register comprising a number of addressable character storage locations equal to a preselected maximum number of characters in an instruction word, memory means for storing a sequence of instruction words of variable length, each comprising a sequence of character codes, each character code representing the first character of an instruction word including an index bit, timing means operable to a first or a second state for sequentially addressing the character storage locations of said instruction register in its first state, reading means synchronized with said timing means in its first state for sequentially reading characters from said memory means, index detecting means controlled by said reading means for producing a first control signal when a character code including an index bit is read from said memory, means governed by said first control signal for actuating said timing means to its first state, character detecting means controlled by said reading means for producing a second control signal when a character read from the memory means corresponds to a preselected character, means controlled by said timing means and said reading means and inhibited by said second control signal for entering characters read from said memory means into locations in said instruction register selected by said timing means when said second control signal is absent, and means controlled by said first control signal and said timing means for actuating said timing means to its second state when an index bit has been detected and at least the second location in the instruction register has been addressed.

7. In combination with a digital data processing system having an instruction register comprising a number of addressable character storage locations equal to a preselected maximum number of characters in an instruction word, memory means for storing a sequence of instruction words of varaible length, each comprising a sequence of character codes, each character code representing the first character of an instruction word being stored with an index bit, reading means for sequentially reading characters from said memory means, index detecting means controlled by said reading means for producing a first control signal when a character code and an index bit are read from said memory means, distributing means actuable to a plurality of states including a state P0, a state P$n$, where $n$ is an identifying number at least one more than the maximum number of locations in the instruction register, and other states equal in number to one less than the number of locations in the instruction register, addressing means controlled by said distributing means for addressing a different location in the instruction register for each state of the distributing means except P$n$, means governed by said first control signal and said distributing means in its P$n$ state for actuating said distributing means to its P0 state, timing means synchronized with said reading means for actuating the distributing means from its state P0 successively to its other states except P$n$ as successive characters are read from the memory means, character detecting means controlled by said reading means for producing a second control signal when a character read from the memory means corresponds to a preselected character, means controlled by said distributing means and said reading means and inhibited by said second control signal for entering characters read from said memory means into the locations in the instruction register addressed by said distributing means when said second control signal is absent, and means controlled by said first control signal and said distributing means in any of its states except P0 and P$n$ for actuating said distributing means to its P$n$ state when an index bit is detected indicating the first character of a second instruction word.

8. In combination with an instruction storage means for an internally programmed information processing system, said storage means having storage capacity for a predetermined number of characters in an instruction word, a source of character signals, distributing means responsive to said source for addressing successive locations in said storage means and operable unless inhibited to enter a character in each addressed location, and inhibiting means controlled by said source and responsive to a preselected character to inhibit the entry of a character in the addressed location of the storage means.

9. In combination with an instruction register comprising at least two addressable character registers for storing characters of an instruction word, character source means for sequentially producing two character signals, a skip character detector controlled by said source means for producing a first or a second control signal according as the character signals produced by said source do or do not correspond to a predetermined character, distributing means controlled by said source means for sequentially addressing said character registers as said signals are produced, and means controlled by said second control signal, said character source means and said distributing means for changing the contents of the addressed character register to agree with the character being produced if the latter differs from said predetermined character.

10. In combination, instruction storage means having a succession of addressable character storage locations for storing character signals representing the characters of an instruction word, distributing means for sequentially addressing said storage locations, means synchronized with said distributing means for supplying a sequence of character signals, one for each addressed location, and means responsive to each character signal for entering or not entering it in the addressed location according as it is not or is the same as a preselected character.

11. In an internally programmed information processing system for executing a program defined by a series of instruction words, each comprising one or more characters up to a preselected maximum number, each character being either a particular of an instruction or a preselected skip character, memory means addressable character by character for storing said sequence of instructions in the form of a sequence of character codes including an index code for each first character in an instruction word, instruction storage means addressable character by character for storing an instruction word in the form of a sequence of character codes equal to said predetermined number, sequentially operable means operatively connected to said memory means to produce a series of character code signals corresponding to a sequence of instruction words stored in said memory, distributing means actuable to a plurality of states including at least a state P0, a state P*n* and at least one additional state P1 for addressing said instruction storing means to enable a different character in the stored instruction word to be changed in each different state of the distributing means except the state P*n*, the number of additional states of the distributing means including P1 being equal to one less than said predetermined number, index code responsive means controlled by said sequentially operable means to produce an index signal when the character code signal produced by said sequentially operable means corresponds to the first character in an instruction word, timing means synchronized with said sequentially operable means and actuated by said distributing means in its state P*n* and said index signal for actuating said distributing means sequentially to each of its states other than P*n* once for each character signal produced, skip character detecting means responsive to the character signals produced by said sequentially operable means for producing a first or a second signal for each character signal according as the character signal is the same as or different from said skip character, respectively, and means controlled by said sequentially operable means, said distributing means and said skip character detecting means and enabled in preselected states of said distributing means to change the character of the instruction word selected by the state of the distributing means in the instruction word storage means to correspond to the character signal produced by said sequentially operable means when and only when said second signal is present.

12. In combination with an internally programmed information processing system having instruction storage means for storing an instruction word comprising at least an operation code and a memory address code, means for producing in sequence code signals corresponding first to an operation code and then to a memory address code, means responsive to said memory address code signal to produce a first or a second control signal according as said code signal is the same as or different from a predetermined code signal, means controlled by said signal producing means for storing the operation code in said instruction storage means, and means controlled by said signal producing means and said second control signal for storing said memory address code in said instruction storage means.

13. In combination with an instruction register for an internally programmed information processing system, said register comprising sequential storage locations for a plurality of characters defining an instruction word, a control register settable to first and second states, a character register for storing a character of an instruction word, sequencing means for sequentially shifting into and later out of said character register a sequence of instruction word characters, distributing means synchronized with said sequencing means for sequentially addressing the locations of said instruction register to enable the character stored at said location to be changed, means actuated by said control register in its first state for changing the character stored at each location addressed by the distributing means to correspond with the character stored in the character register, means controlled by the character register for producing a first or a second control signal according as the character stored in said character register is or is not the same as a preselected character, respectively, means controlled by said distributing means and said first control signal for setting said control register to its second state as predetermined locations in the instruction register are addressed, and means controlled by said distributing means and said second control signal for setting said control register to its first state as said predetermined locations are addressed.

14. In an internally programmed information processing system, timing means for periodically producing a predetermined sequence of discrete time signals including at least a first and a second signal, a first register for storing a character, instruction storage means for storing a predetermined number of characters, character detecting means controlled by said first register and actuable to a first or a second state according as a predetermined character is or is not stored in said first register, respectively, a source of characters, means controlled by said source and said timing means for shifting successive characters into said first register in response to each second signal and shifting the character out of said first register in response to the next first signal, means controlled by said first register, said timing means, and said character detecting means for storing the character in said first register in said instruction storage means in response to each first signal occurring when said character detecting means is in its second state.

15. Information processing means, comprising, in combination, addressable instruction storage means for storing a preselected number of characters of an instruction word at different addresses, a source of instruction words comprising sequences of characters, means for sequentially examining characters from said source and actuated to a first or a second state according as the character under examination is or is not a preselected character, distributing means synchronized with said character signal examining means and actuated to a different one of a number of successive states corresponding to the character capacity of said instruction storage means once for each character examined, a control register settable to a first or a second state, means actuated by said character examining means in its second state and said distributing means in predetermined states for setting said control register to its first state, means actuated by said character examining means in its first state and said distributing means in said predetermined states for setting said control register to its second state, and means actuated by said control register in its first state and said distributing means for entering examined characters into addresses in said instruction storage means selected by the state of the distributing means.

16. In combination with a digital data processing system having an instruction register comprising a number of addressable character storage locations equal to a preselected maximum number of characters in an instruction word, the instruction word comprising character groups each comprising at least a first character and each group having a different significance, a source of character signals for presenting an instruction word in the form of a sequence of groups of character signals, distributing means for sequentially addressing the storage locations of said address register, character signal detecting means responsive to the first character signal of each group for producing a first or a second signal according as the signal does or does not correspond to a predetermined skip character, respectively, a control register settable to first and second states, means controlled by said control register in its first state, said source, and said distributing means for entering a group of characters into said instruction register at sequential locations selected by said distributing means, and means controlled by said character signal detecting means for actuating said control register to its first state in response to said second signal and to its second state in response to said second signal.

References Cited

UNITED STATES PATENTS

| | | | |
|---|---|---|---|
| 3,185,824 | 5/1965 | Blasbalg et al. ------ | 235—154 |
| 3,221,308 | 11/1965 | Petersen et al. ---- | 340—172.5 |
| 3,018,956 | 1/1962 | Hosier et al. -------- | 235—157 |
| 3,119,098 | 1/1964 | Meade ----------- | 340—172.5 |
| 3,202,972 | 8/1965 | Stafford et al. ------ | 340—172.5 |
| 3,223,982 | 12/1965 | Sacedoti et al. ------ | 340—172.5 |

ROBERT C. BAILEY, *Primary Examiner.*

R. M. RICKERT, *Assistant Examiner.*